(12) United States Patent
Luff et al.

(10) Patent No.: US 8,406,341 B2
(45) Date of Patent: Mar. 26, 2013

(54) VARIABLE ENCODING AND DETECTION APPARATUS AND METHODS

(75) Inventors: Robert A. Luff, Whittman, MD (US); Weston P. Headley, Battle Ground, WA (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 974 days.

(21) Appl. No.: 11/852,049

(22) Filed: Sep. 7, 2007

(65) Prior Publication Data
US 2008/0101454 A1     May 1, 2008

Related U.S. Application Data

(63) Continuation of application No. PCT/US2005/007562, filed on Mar. 8, 2005.

(60) Provisional application No. 60/538,701, filed on Jan. 23, 2004.

(51) Int. Cl.
*H04L 27/00* (2006.01)
*H03K 9/00* (2006.01)

(52) U.S. Cl. ........ 375/316; 375/295; 375/324; 375/340; 375/345

(58) Field of Classification Search .................. 375/355, 375/295, 316, 324, 340, 345
See application file for complete search history.

(56) References Cited

U.S. PATENT DOCUMENTS

| | | |
|---|---|---|
| 3,056,135 A | 9/1962 | Currey et al. |
| 4,107,734 A | 8/1978 | Percy et al. |
| 4,382,291 A | 5/1983 | Nakauchi et al. |
| 4,626,904 A | 12/1986 | Lurie |
| 4,644,509 A | 2/1987 | Kiewit et al. |
| 4,695,879 A | 9/1987 | Weinblatt |
| 4,718,106 A | 1/1988 | Weinblatt |
| 4,769,697 A | 9/1988 | Gilley et al. |
| 4,779,198 A | 10/1988 | Lurie |
| 4,930,011 A | 5/1990 | Kiewit |
| 4,955,000 A | 9/1990 | Nastrom |
| 4,972,471 A | 11/1990 | Gross et al. |
| 4,972,503 A | 11/1990 | Zurlinden |
| 4,990,892 A | 2/1991 | Guest et al. |
| 5,119,104 A | 6/1992 | Heller |
| 5,146,231 A | 9/1992 | Ghaem et al. |
| 5,226,090 A | 7/1993 | Kimura |
| 5,226,177 A | 7/1993 | Nickerson |

(Continued)

FOREIGN PATENT DOCUMENTS

| | | |
|---|---|---|
| GB | 2260246 | 7/1993 |
| GB | 2292506 | 2/1996 |

(Continued)

OTHER PUBLICATIONS

Fang et al., "Design of a Wireless Assisted Pedestrian Dead Reckoning System—The NavMote Experience," vol. 54, Issue 6, Institute of Electrical and Electronics Engineers (IEEE), Dec. 2005 (16 pages).

(Continued)

*Primary Examiner* — Ted Wang
(74) *Attorney, Agent, or Firm* — Hanley, Flight & Zimmerman, LLC

(57) ABSTRACT

Apparatus, methods, and articles of manufacture for media monitoring are disclosed. In particular, the example apparatus, methods, and articles of manufacture determine a media source type associated with a media signal and select an encoding or decoding mode based on the media source type. An encoding operation encodes the media signal using the selected encoding mode and a decoding operation decodes the media signal using the selected decoding mode.

12 Claims, 11 Drawing Sheets

U.S. PATENT DOCUMENTS

| | | | |
|---|---|---|---|
| 5,285,498 | A | 2/1994 | Johnston |
| 5,382,970 | A | 1/1995 | Kiefl |
| 5,387,993 | A | 2/1995 | Heller et al. |
| 5,404,377 | A | 4/1995 | Moses |
| 5,442,343 | A | 8/1995 | Cato |
| 5,457,807 | A | 10/1995 | Weinblatt |
| 5,473,631 | A | 12/1995 | Moses |
| 5,481,294 | A | 1/1996 | Thomas et al. |
| 5,483,276 | A | 1/1996 | Brooks et al. |
| 5,550,928 | A | 8/1996 | Lu et al. |
| 5,574,962 | A | 11/1996 | Fardeau et al. |
| 5,579,124 | A | 11/1996 | Aijala et al. |
| 5,581,800 | A | 12/1996 | Fardeau et al. |
| 5,629,739 | A | 5/1997 | Dougherty |
| 5,630,203 | A | 5/1997 | Weinblatt |
| 5,640,144 | A | 6/1997 | Russo et al. |
| 5,646,675 | A | 7/1997 | Copriviza et al. |
| 5,692,215 | A | 11/1997 | Kutzik et al. |
| 5,774,876 | A | 6/1998 | Woolley et al. |
| 5,787,334 | A | 7/1998 | Fardeau et al. |
| 5,793,409 | A | 8/1998 | Tetsumura |
| 5,812,081 | A * | 9/1998 | Fullerton ............. 342/21 |
| 5,812,930 | A | 9/1998 | Zavrel |
| 5,815,114 | A | 9/1998 | Speasl et al. |
| 5,872,588 | A | 2/1999 | Aras et al. |
| 5,884,278 | A | 3/1999 | Powell |
| 5,893,093 | A | 4/1999 | Wills |
| 5,982,808 | A | 11/1999 | Otto |
| 6,002,918 | A | 12/1999 | Heiman et al. |
| 6,035,177 | A | 3/2000 | Moses et al. |
| 6,091,956 | A | 7/2000 | Hollenberg |
| 6,098,048 | A | 8/2000 | Dashefsky et al. |
| 6,243,739 | B1 | 6/2001 | Schwartz et al. |
| 6,252,522 | B1 | 6/2001 | Hampton et al. |
| 6,314,234 | B1 * | 11/2001 | Kawamura et al. ........... 386/241 |
| 6,359,557 | B2 | 3/2002 | Bilder |
| 6,396,413 | B2 | 5/2002 | Hines et al. |
| 6,424,264 | B1 | 7/2002 | Giraldin et al. |
| 6,430,498 | B1 | 8/2002 | Maruyama et al. |
| 6,433,689 | B1 | 8/2002 | Hovind et al. |
| 6,467,089 | B1 | 10/2002 | Aust et al. |
| 6,470,264 | B2 | 10/2002 | Bide |
| 6,493,649 | B1 * | 12/2002 | Jones et al. ............. 702/150 |
| 6,497,658 | B2 | 12/2002 | Roizen et al. |
| 6,563,423 | B2 | 5/2003 | Smith |
| 6,577,238 | B1 | 6/2003 | Whitesmith et al. |
| 6,654,800 | B1 | 11/2003 | Rieger, III |
| 6,731,942 | B1 | 5/2004 | Nageli |
| 6,748,317 | B2 | 6/2004 | Maruyama et al. |
| 6,766,524 | B1 | 7/2004 | Matheny et al. |
| 6,842,877 | B2 | 1/2005 | Robarts et al. |
| 6,850,252 | B1 * | 2/2005 | Hoffberg ............. 715/716 |
| 6,882,837 | B2 | 4/2005 | Fernandez et al. |
| 6,888,457 | B2 | 5/2005 | Wilkinson et al. |
| 6,891,547 | B2 * | 5/2005 | Kang et al. ............. 345/555 |
| 6,898,434 | B2 | 5/2005 | Pradhan et al. |
| 6,919,803 | B2 | 7/2005 | Breed |
| 6,928,280 | B1 | 8/2005 | Xanthos et al. |
| 6,934,508 | B2 | 8/2005 | Ceresoli et al. |
| 6,940,403 | B2 | 9/2005 | Kail, IV |
| 6,958,710 | B2 | 10/2005 | Zhang et al. |
| 6,967,674 | B1 | 11/2005 | Lausch |
| 6,970,131 | B2 | 11/2005 | Percy et al. |
| 7,038,619 | B2 | 5/2006 | Percy et al. |
| 7,046,162 | B2 | 5/2006 | Dunstan |
| 7,076,441 | B2 | 7/2006 | Hind et al. |
| 7,080,061 | B2 | 7/2006 | Kabala |
| 7,099,676 | B2 | 8/2006 | Law et al. |
| 7,126,454 | B2 | 10/2006 | Bulmer |
| 7,148,803 | B2 | 12/2006 | Bandy et al. |
| 7,155,159 | B1 | 12/2006 | Weinblatt et al. |
| 7,171,331 | B2 | 1/2007 | Vock et al. |
| 7,222,071 | B2 | 5/2007 | Neuhauser et al. |
| 7,224,819 | B2 * | 5/2007 | Levy et al. ............. 382/100 |
| 7,295,108 | B2 | 11/2007 | Corrado et al. |
| 7,312,752 | B2 * | 12/2007 | Smith et al. ............. 342/464 |
| 7,417,987 | B2 | 8/2008 | Shenoy et al. |
| 7,460,827 | B2 | 12/2008 | Schuster et al. |
| 7,463,143 | B2 | 12/2008 | Forr et al. |
| 7,483,975 | B2 | 1/2009 | Kolessar et al. |
| 2002/0068556 | A1 | 6/2002 | Brown |
| 2002/0144259 | A1 | 10/2002 | Gutta et al. |
| 2002/0150387 | A1 | 10/2002 | Kunii et al. |
| 2002/0174425 | A1 | 11/2002 | Markel et al. |
| 2002/0198762 | A1 | 12/2002 | Donato |
| 2003/0002598 | A1 * | 1/2003 | Inose et al. ............. 375/316 |
| 2003/0033600 | A1 | 2/2003 | Cliff et al. |
| 2003/0070182 | A1 | 4/2003 | Pierre et al. |
| 2003/0093784 | A1 | 5/2003 | Dimitrova et al. |
| 2003/0097302 | A1 | 5/2003 | Overhultz et al. |
| 2003/0122708 | A1 | 7/2003 | Percy et al. |
| 2003/0126593 | A1 | 7/2003 | Mault |
| 2003/0136827 | A1 | 7/2003 | Kaneko et al. |
| 2003/0146871 | A1 | 8/2003 | Karr et al. |
| 2003/0171833 | A1 | 9/2003 | Crystal et al. |
| 2003/0177488 | A1 | 9/2003 | Smith et al. |
| 2003/0194004 | A1 | 10/2003 | Srinivasan |
| 2003/0208754 | A1 | 11/2003 | Sridhar et al. |
| 2003/0222819 | A1 | 12/2003 | Karr et al. |
| 2003/0222820 | A1 | 12/2003 | Karr et al. |
| 2004/0019675 | A1 | 1/2004 | Hebeler et al. |
| 2004/0025174 | A1 | 2/2004 | Cerrato |
| 2004/0027271 | A1 | 2/2004 | Schuster et al. |
| 2004/0101071 | A1 * | 5/2004 | Naito ............. 375/340 |
| 2004/0122679 | A1 | 6/2004 | Neuhauser et al. |
| 2004/0198386 | A1 | 10/2004 | Dupray |
| 2004/0266457 | A1 | 12/2004 | Dupray |
| 2005/0022255 | A1 * | 1/2005 | Oh ............. 725/143 |
| 2005/0035857 | A1 | 2/2005 | Zhang et al. |
| 2005/0141345 | A1 | 6/2005 | Holm et al. |
| 2005/0144632 | A1 | 6/2005 | Mears et al. |
| 2005/0172311 | A1 | 8/2005 | Hjelt et al. |
| 2005/0200476 | A1 | 9/2005 | Forr et al. |
| 2005/0201826 | A1 | 9/2005 | Zhang et al. |
| 2005/0203798 | A1 | 9/2005 | Jensen et al. |
| 2005/0204379 | A1 | 9/2005 | Yamamori |
| 2005/0207592 | A1 | 9/2005 | Sporer et al. |
| 2005/0216509 | A1 | 9/2005 | Kolessar et al. |
| 2005/0234774 | A1 | 10/2005 | Dupree |
| 2005/0243784 | A1 | 11/2005 | Fitzgerald et al. |
| 2005/0264430 | A1 | 12/2005 | Zhang et al. |
| 2006/0053110 | A1 | 3/2006 | McDonald et al. |
| 2006/0075421 | A1 | 4/2006 | Roberts et al. |
| 2006/0168613 | A1 | 7/2006 | Wood et al. |
| 2007/0011040 | A1 | 1/2007 | Wright et al. |
| 2007/0020585 | A1 * | 1/2007 | Bjorkman et al. ............. 434/11 |
| 2007/0288277 | A1 | 12/2007 | Neuhauser et al. |
| 2007/0288476 | A1 | 12/2007 | Flanagan et al. |
| 2007/0294057 | A1 | 12/2007 | Crystal |
| 2007/0294132 | A1 | 12/2007 | Zhang et al. |
| 2007/0294705 | A1 | 12/2007 | Gopalakrishnan et al. |
| 2007/0294706 | A1 | 12/2007 | Neuhauser et al. |
| 2008/0101454 | A1 | 5/2008 | Luff et al. |
| 2008/0204273 | A1 | 8/2008 | Crystal et al. |

FOREIGN PATENT DOCUMENTS

| | | |
|---|---|---|
| JP | 2000307530 | 11/2000 |
| WO | 9111062 | 7/1991 |
| WO | 9411989 | 5/1994 |
| WO | 9731440 | 8/1997 |
| WO | 9955057 | 10/1999 |
| WO | 0131816 | 5/2001 |
| WO | 03087871 | 10/2003 |
| WO | 03095945 | 11/2003 |
| WO | 2004051303 | 6/2004 |
| WO | 2004051304 | 6/2004 |
| WO | 2005038625 | 4/2005 |
| WO | 2005094325 | 10/2005 |
| WO | 2006037014 | 4/2006 |
| WO | 2006096177 | 9/2006 |

OTHER PUBLICATIONS

Bernstein et al., "An Introduction to Map Matching for Personal Navigation Assistants," New Jersey TIDE Center, New Jersey Institute of Technology, Aug. 1996 (17 pages).

Kerschbaumer, Ken, "Who's Really Watching? How Cable's Digital Box Will Rock the Ratings World," Reed Business Information, a Division of Reed Elsevier, Inc., May 16, 2005 (4 pages).

McCarthy et al., "RF Free Ultrasonic Positioning," Department of Computer Science, University of Bristol, U.K., 2003 (7 pages).

McCarthy et al., "RF Free Ultrasonic Positioning (Presentation)," 7th International Symposiom on Wearable Computers, Oct. 2003 (12 pages).

Gentile et al., "Robust Location using System Dynamics and Motion Constraints," National Institute of Standards and Technology, Wireless Communication Technologies Group, Jun. 24, 2004 (5 pages).

Cricket Project, "Cricket v2 User Manual," MIT Computer Science and Artificial Intelligence Lab, Cambridge, U.S.A., Jan. 2005 (57 pages).

Holm, Sverre, "Technology Presentation," [online]. Sonitor Technologies, May 26, 2004 [retrieved on Oct. 13, 2004]. Retrieved from the Internet: <URL: www.sonitor.com/news/article.asp?id=62> (16 pages).

"The Nibble Location System," [online]. UCLA, May 21, 2001 [retrieved on Nov. 2, 2004]. Retrieved from the Internet: <URL: http://mmsl.cs.ucla.edu/nibble/>. (13 pages).

"New Sonitor Patent Combines Ultrasound and RFID," [online]. Sonitor Technologies, Feb. 17, 2005 [retrieved on Jun. 13, 2005]. Retrieved from the Internet: <URL: http://sonitor.com/news/article.asp?id=73>. (1 page).

"NIST Location System," [online]. Wireless Communication Technologies Group, National Institute of Standards and Technology, Mar. 12, 2004 [retrieved in Nov. 11, 2004]. Retrieved from the Internet: <URL: www.antd.nist.gov>. (2 pages).

Ferguson, Michael. "XTension Tech Notes," [online]. Sand Hill Engineering Inc., Dec. 10, 1998 [retrieved in Jan. 12, 2004]. Retrieved from the Internet: <URL: http://www.shed.com/articles/TN.proximity.html >. (9 pages).

"FM Wireless Microphone Module Kits," [online]. Horizon Industries, 2004 [retrieved on Sep. 30, 2004]. Retrieved from the Internet: <URL: www.horizonindustries.com/fm.htm>. (1 page).

"Arkon Sound Feeder II FM Transmitter," [online]. Yahoo Shopping, 2002 [retrieved on Sep. 29, 2004]. Retrieved from the Internet: <URL: http://store.yahoo.com/semsons-inc/arsoundfeedii.html>. (2 pages).

"Dust Networks—SmartMesh," [online]. Dust Networks Inc., 2002 [retrieved on Sep. 29, 2004]. Retrieved from the Internet: <URL: www.dustnetworks.com>. (2 pages).

Kanellos, Michael. "Dust Makes Mesh of Wireless Sensors," [online]. CNET News.com, Sep. 20, 2004 [retrieved on Sep. 29, 2004]. Retrieved from the Internet: <URL: http://www.news.com/Dust-makes-mesh-of-wireless-sensors/2100-1008_3-5374971.html?tag=item>. (2 pages).

"UHF Radio Data Logging System—GenII Data Logger," [online]. Amplicon, 2004 [retrieved on Sep. 29, 2004]. Retrieved from the Internet: <URL: www.amplicon.co.uk/dr-prod3 . cfm/sub secid/10037/secid/1/groupid/11809.htm>. (3 pages).

"Eltek GenII Radio Data Logging System," [online]. Eltek Ltd., 2004 [retrieved on Sep. 9, 2004]. Retrieved from the Internet: <URL: www.elteckdataloggers.co.uk>. (4 pages).

"World's Smallest Hands Free Radio," [online]. Yahoo Shopping, 2004 [retrieved on Sep. 29, 2004]. Retrieved from the Internet: <URL: http://store.yahoo.com/latesttrends/worsmalhanfr.html>. (1 page).

"American Technology Corporation-Retailer Ads-AM & FM Sounds," [online]. Woody Norris, May 4, 2004 [retrieved on Sep. 29, 2009]. Retrieved from the Internet: <URL: www.woodynorris.com>. (3 pages).

"X1 Button Radio—The World's Smallest Radio," [online]. Exxun, 2004 [retrieved on Sep. 29, 2009]. Retrieved from the Internet: <URL: www.exxun.com>. (2 pages).

"Discovery Spy Motion Tracking System," [online]. Discovery Communications Inc., 2004 [retrieved on Sep. 9, 2004]. Retrieved from the Internet: <URL: http://shopping.discovery.com/stores/servlet/ProductDisplay?catalogId=10000&storeId=10000&lanlan=-1&productId=53867&partnumber=689638>. (3 pages).

Schuman, Evan. "Smarter Smart Cart?" [online]. Storefront Backtalk, Feb. 16, 2005 [retrieved on Nov. 20, 2006]. Retrieved from the Internet: <URL: www.storefrontbacktalkcom>. (5 pages).

"Arbitron & Scarborough Unveil New Mall Shopper Audience Measurement," [online]. Streamline Media Inc., Jun. 22, 2007 [retrieved in 2007]. Retrieved from the Internet: <URL: www.radioink.com>. (2 pages).

"University Library Navigation Enabled by Ekahau," [online]. Directions Magazine, Jun. 12, 2003 [Aug. 3, 2007]. Retrieved from the Internet: <URL: http://www/directionsmag.com/press.releases/index.php?duty=Show&id=7276&trv=1>. (3 pages).

The Patent Cooperation Treaty Search Report mailed Oct. 31, 2006 in corresponding PCT application No. PCT/US05/34743, filed Sep. 27, 2005, 4 pages.

The Patent Cooperation Treaty Search Opinion mailed Oct. 31, 2006 in corresponding PCT application No. PCT/US05/34743, filed Sep. 27, 2005, 9 pages.

Yeung, K.L., & Yum, T.-S.P. "A Comparative Study on Location Tracking Strategies in Cellular Mobile Radio Systems," Global Telecommunications Conference, 1995. Globecom '95, IEEE, Nov. 14-26, 1995 (pp. 22-28 vol. 1).

Handy et al., "Lessons Learned from Developing a Bluetooth Multiplayer-Game," 2nd International Conference on Pervasive Computing, Workshop on Gaming, [retrieved from internet, http://www.ipsi.fraunhofer.de/ambiente/ pervasivegaming/papers/Handy_Pervasive2004.pdf] (pp. 7).

Battiti, Roberto, et al. "Location-Aware Computing: a Neutral Network Model for Determining Location in Wireless LANS" University of Trento: Department of Information and Communication Technology, Technical Report #DIT-02-0083, Feb. 2002 (pp. 1-16).

Azondekon et al., "Service Selection in Networks Based on Proximity Confirmation Using Infrared", http://www.scs.carleton.ca/~barbeau/Publications/2002/azondekon.pdf, International Conference on Telecommunications (ICT) Beijing, 2002 (5 Pages).

Bahl et al., "A Software System for Locating Mobile Users: Design, Evaluation, and Lessons", Technical Report MSRTR-Dec. 2002 Microsoft Research, [retrieved from internet, http://research.microsoft.com/~bahl/Papers/Pdf/radar.pdf] , Feb. 2000 (13 Pages).

Wagner, David P. Battelle. Report: Lexington Area Travel Data Collection Test; GPS for Personal Travel Surveys. Final Report for Office of Highway Information Management, Office of Technology Application, and Federal Highway Administration, Sep. 1997, (92 pages).

Mexican Office Action, issued by the Instituto Mexicano de la Propiedad Industrial on Nov. 11, 2009, in connection with the Mexican patent application No. MX/a/2007/011127, 2 pages.

European Patent Office, Supplementary European Search Report, from Corresponding Application No. EP 05 72 4978, Jan. 28, 2008, 2 pages.

International Preliminary Examining Authority, International Preliminary Examination Report, from Corresponding Application No. PCT/US2005/07562, Nov. 2, 2006, 4 pages.

International Searching Authority, International Search Report, from Corresponding Application No. PCT/US2005/07562, Mar. 2, 2006, 1 page.

Second Australian Office Action, issued by the Australian Government on Jan. 15, 2010, in connection with the Australian patent application No. 2005328684, 2 pages.

"Examiner's first report on patent application No. 2005328684 by Nielsen Media Research, Inc.," issued by the Australian Government, on May 15, 2009, 2 pages.

"Examiner's first report on patent application 2009250975," issued by the Australian Government, IP Australia, on Aug. 19, 2010, in connection with Australian patent application No. 2009250975, 6 page.

European Office Action, issued by the European Patent Office in connection with European Application No. 05 724 978.1-1522, 7 pages.

* cited by examiner

VARIABLE ENCODING AND DETECTION APPARATUS AND METHODS

RELATED APPLICATION

This application is a continuation of International Application Serial No. PCT/US2005/07562, filed on Mar. 8, 2005, which claims the benefit of the filing date of U.S. Provisional Application Ser. No. 60/538,701, which was filed on Jan. 23, 2004, the entire disclosures of which are incorporated by reference herein.

FIELD OF THE DISCLOSURE

The present disclosure relates generally to media metering and, more specifically, to variable encoding and detection apparatus and methods for use with media metering systems.

BACKGROUND

Some recent development efforts associated with monitoring the media consumption behaviors of individuals have been directed toward personal portable meters (PPM's) or portable media monitors. In contrast to the relatively stationary media metering devices used with more traditional media monitoring systems, PPM's are carried by monitored individuals or panelists as they engage in their regular daily activities, including media consumption activities. For example, each panelist may attach a PPM to their clothing (e.g., to a belt or waist portion of their pants) and may move freely about their home and, in some cases outside their home, while wearing (or at least carrying) the PPM.

As a person or panelist travels with their PPM throughout their household and outside their household, the PPM receives media signals such as, for example, audio and/or video content information provided by media delivery devices (e.g., televisions, radios, etc.) distributed throughout the household. The media signals received by the PPM may be encoded to facilitate subsequent identification of the audio/video content or programs and/or the PPM's may be configured to use signature generation techniques to identify audio/video content or programs received by the PPM's. Each person's PPM may receive a media signal or signals (i.e., different audio/video content) based on their unique location and their location relative to the one or more media delivery devices to which they and their PPM are exposed.

To measure media consumption, many PPM's are configured to capture identification codes that have been embedded in the audio signals associated with television programs, radio programs, etc. These codes, which are often referred to as ancillary codes, may be captured or extracted by a PPM and later transmitted to a central data processing facility that uses the codes to identify the programming that was consumed (e.g., viewed, listened to, etc.) and to properly credit that consumption to the appropriate programs. The portable nature of PPM's enables these devices to be used to measure media consumption activities that occur both inside the home and outside the home. Although PPM's have some advantages and capabilities that otherwise stationary metering devices do not, the code detection capabilities of many known PPM's are limited.

In a typical household there are often multiple media delivery devices and multiple such devices are often delivering media signals (e.g., audio and/or video content) at the same time. In some cases, a person's PPM may receive a media signal from a media delivery device even if that person is not actively or intentionally consuming the media signal. Such an effect is commonly referred to as spillover because media delivered in one area spills over into another area occupied by monitored individuals who are not actively or intentionally consuming that media. In other cases, a person's PPM may receive media signals from multiple media delivery devices at the same time. For example, an adult watching the news via a television in the kitchen may be located near to a family room in which children are watching cartoons. In that case, the adult's PPM may receive stronger (e.g., code rich) audio/video content signals that overpower or hijack the sparse audio/video content (e.g., audio/video content having a relatively low code density) that the adult is actively and intentionally consuming. As a result, the adult's PPM (or a central facility receiving information from the PPM) may incorrectly determine that the adult is watching cartoons. Still further, other common difficulties such as varying volume levels, varying audio/video content type (e.g., sparse, medium, rich, etc.), varying household transmission characteristics due to open/closed doors, movement of furniture, etc. often lead to inaccurate media consumption measurements by PPM's.

DETAILED DESCRIPTION

Although the example systems described herein include, among other components, software executed on hardware, such systems are merely illustrative and should not be considered as limiting. For example, it is contemplated that any or all of the disclosed hardware and software components could be embodied exclusively in dedicated hardware, exclusively in software, exclusively in firmware or in some combination of hardware, firmware, and/or software.

In addition, while the following disclosure is made with respect to example television and radio systems, it should be understood that the disclosed system is readily applicable to many other media systems. Accordingly, while the following describes example systems and processes, persons of ordinary skill in the art will readily appreciate that the disclosed examples are not the only way to implement such systems.

Figure 1:
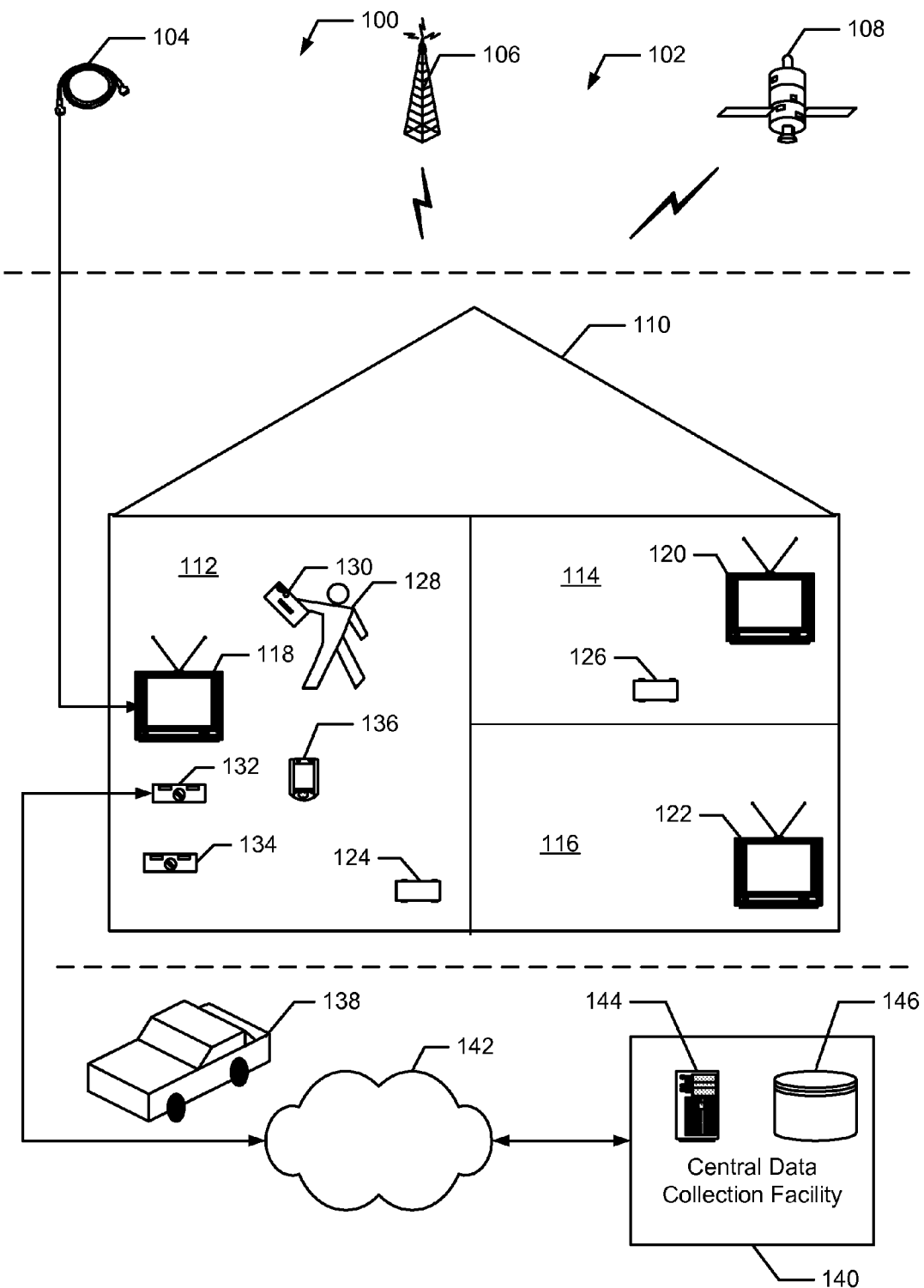
FIG. 1 depicts an example media monitoring system.

FIG. 1 depicts an example media monitoring system 100 including a media service provider 102, which may be, for example a television service provider, a radio program service provider, etc. The media service provider 102 may include a cable network 104, one or more radio towers or transmitters 106 and one or more satellites 108. For example, in the case where the media service provider 102 is a cable television provider, the media service provider 102 may distribute television program signals primarily or only via the cable network 104. On the other hand, in the case where the media service provider 102 is a satellite broadcast service, the media service provider 102 may deliver media signals to consumers directly via the one or more satellites 108 without using the cable network 104 or the radio towers 106.

The media service provider 102 may transmit media signals in any suitable format such as a National Television Standards Committee (NTSC) television signal format, a high definition television (HDTV) signal format, an Advanced Television Systems Committee (ATSC) television signal format, a phase alternation line (PAL) television signal format, a digital video broadcasting (DVB) television signal format, an Association of Radio Industries and Businesses (ARIB) television signal format, etc.

In some examples, and as described in greater detail below, the media service provider 102 may vary the manner in which it encodes the media signals it transmits based on the type of media signal being transmitted. For example, television signals may be encoded in one manner, while radio program signals are encoded in a different manner. More specifically, the media service provider 102 may be configured to encode different types of media signals in different manners to facilitate the monitoring of the media signals in the environment in which the media signals are typically consumed. In some examples, ancillary codes may be embedded or inserted at a higher rate or greater density into radio signals than the rate or density at which codes are inserted or embedded into television signals. In other examples, the strength or power of an embedded code may be increased or decreased based on the type of media signal into which the code is embedded. For example, codes embedded in radio signals may be relatively stronger (e.g., may have relatively greater power levels) than codes embedded in television signals. In still other examples, multiple identification codes may be embedded in both television and radio signals so that each media signal contains both relatively strong (e.g., higher power) codes and relatively weak (e.g., lower power) codes at the same time.

Regardless of the particular encoding scheme used by the media service provider 102, the system 100 also includes one or more households that receive media signals from the media service provider 102. An example household 110 is depicted as having a plurality of rooms or consumption spaces 112, 114 and 116. Of course, other households (not shown) may have more or fewer consumption spaces than those depicted in connection with the example household 110. As is common, one or more of the spaces or rooms within a household may include none, one, or more than one media delivery or presentation device such as, for example, a television, a radio or the like. In the example household 110, each of the consumption spaces 112, 114 and 116 includes a respective television 118, 120 and 122. In addition, the spaces 112 and 114 include respective radios 124 and 126. However, if desired, more or fewer radios, televisions, or any other media presentation or delivery devices may be placed within one or more of the consumption spaces 112, 114 and 116.

The household 110 may be occupied by one or more audience members 128 that have enlisted to participate in media monitoring activities. The audience members 128 may have access to a remote control device 130 that facilitates the changing of the channel to which one or more of the televisions 118, 120 and 122 are tuned and/or the station to which one or more of the radios 124 and 126 are tuned. To monitor the media consumption activities of the audience member 128, a base metering device 132 and a people meter 134 are operatively coupled to the television 118 and/or the radio 124. Additional base metering devices (not shown) may be similarly coupled to the other televisions 120 and 122 as well as the other radio 126. In addition, each of the audience members or panelists 128 is assigned a portable metering device 136 (e.g., a PPM) that may be carried (e.g., worn on a belt, hand carried, etc.) by the audience member 128 as the audience member 128 moves throughout the household 110 and outside of the household 110. As described in greater detail below, the portable metering device 136 may be configured to generate signatures and/or to detect and process codes embedded in audio signals received from one or more of the televisions 118, 120 and 122 and/or one or more radios 124 and 126 within the household 110. The PPM 136 may also be configured to detect and process ancillary codes embedded in audio signals received from, for example, a radio within an automobile 138 or any other space outside of the household 110 in which media signals are present such as, for example, restaurants, bars, nightclubs, public transportation facilities, etc.

As is known, the processing performed by the televisions 118, 120 and 122 may include, for example, extracting a video component delivered via the received signal and an audio component delivered via the received signal, causing the video component to be displayed on a screen/display associated with the televisions 118, 120 and 122, and causing the audio component to be emitted by speakers associated with the televisions. The content contained in the television signal may include, for example, a television program, a movie, an advertisement, a video game, and/or a preview of other programming that is or will be offered by the media service provider 102 now or in the future.

The base metering device 132 is configured as a relatively stationary device disposed on or near the television 118 and may be adapted to perform one or more of a variety of well-known television metering methods. Depending on the types of metering that the base metering device 132 is adapted to perform, the base metering device 132 may be physically coupled to the television 118 or may instead be configured to capture signals (via, for example, a microphone) emitted externally by the television 118 (via, for example, speakers) so that direct physical coupling to the television 118 is not required. As noted above, in addition to the television 118, a base metering device 132 may also be provided for the televisions 120 and 122 to facilitate the capture of all in-home media consumption by the household members. In one example, the base metering device 132 may be implemented as a low-cost electronic device that may be shipped to the household (e.g., via regular mail) and easily installed by the audience member 128 by, for example, plugging the base metering device 132 into a commercial power supply (i.e., an electrical outlet).

As is described in greater detail below, the portable metering device 136 is generally configured to perform television and/or radio metering using audio code capture techniques and/or audio signature capture techniques. In some examples, the portable metering device 136 may be adapted to capture code information and signature information simultaneously. Alternatively, the portable metering device 136 may be adapted to use the code capture techniques as a primary metering method and to use the signature metering techniques as a secondary method (i.e., to supplement the metering performed using the code techniques). Specifically, if one or more audio codes are detected by the portable metering device 136, then the signature method need not be performed. Conversely, if audio codes are not detected, then the portable metering device 136 may perform one or more well-known methods used to capture signature information of the programming delivered by one or more of the televisions 118, 120 and 122 and/or one or more of the radios 124 and 126. Regardless of the manner in which the portable metering device 136 is configured, each audience member (e.g., the audience member 128) preferably carries a portable metering device (e.g., similar or identical to the device 136) at all times.

In general, as the audience member 128 moves within the household 110 and, in particular, as the household member 128 moves among the rooms 112, 114 and 116, the audience member 128 carries the portable metering device 136. In some instances, the audience member 128 may hand carry the portable metering device 136 and, in other cases, the portable metering device 136 may be belt worn or otherwise attached to the clothing or body of the audience member 128. In some examples, the portable metering device 136 detects and processes codes embedded in the audio signals presented or delivered by a media delivery device or devices located in the same consumption space or room in which the audience member 128 and the portable metering device 136 are located. For example, if the audience member 128 carries the portable metering device 136 into the consumption space 112, the portable metering device 136 may detect and process codes contained within media signals (e.g., audio signals) it receives from the television 118 and/or the radio 124. Of course, depending on the volume at which the other media delivery devices 120, 122 and 126 are set, the portable metering device 136 may also detect codes associated with audio signals from those other media devices that spillover into the consumption space 112. However, preferably, the media signals are encoded by the media service provider 102 and are decoded by the portable metering device 136 in manners, such as those described in the examples below, to minimize or eliminate the effects of spillover, hijacking, etc.

Referring still to FIG. 1, the base metering device 132 and the portable metering device 136 may be adapted to communicate with a remotely located central data collection facility 140 via a network 142. The network 142 may be implemented using any type of public or private network such as, but not limited to, the Internet, a telephone network, a local area network (LAN), a cable network, and/or a wireless network. To enable communication via the network 142, the base metering device 132 may include a communication interface that enables connection to an Ethernet, a digital subscriber line (DSL), a telephone line, a coaxial cable, or any wireless connection, etc. Likewise, the portable metering device 136 may include such an interface to enable communication by the portable metering device 136 via the network 142. As will be appreciated by persons of ordinary skill in the art, either or both of the base metering device 132 and the portable metering device 136 may be adapted to send media consumption data to the central data collection facility 140. In the event that only one of the base metering device 132 and the portable metering device 136 is capable of transmitting data (e.g., detected codes, time stamps, etc.) to the central data collection facility 140, the base and portable metering devices 132 and 136 may be adapted to communicate data to each other so that there is a means by which data collected from all metering devices (e.g., the base metering device 132 and/or the portable metering device 136) can be transmitted to the central data collection facility 140. The central data collection facility 140 may include a server 144 and a database 146. Further, the central data collection facility 140 may be adapted to process and store data received from the base metering device 132 and/or the portable metering device 136.

The portable metering device 136 may also communicate via the network 142 using a docking station (not shown) having a cradle in which the portable metering device 136 may be placed to enable transfer of data via the network 142 and to enable a battery (not shown) disposed in the portable metering device 136 to be recharged. The docking station may be operatively coupled to the network 142 via, for example, an Ethernet connection, a digital subscriber line (DSL), a telephone line, a coaxial cable, etc.

In the illustrated example, the portable metering device 136 is a portable electronic device such as, but not limited to, a portable telephone, a personal digital assistant (PDA), and/or a handheld computer. Because of its portability, the portable metering device 136 may be used to meter media consumption that occurs at home, at the office, and/or any other location. For example, the portable metering device 136 may be configured to detect codes contained within a movie and/or a movie preview at a movie theater, audio programs delivered within an automobile (e.g., the automobile 138), radio programs delivered at a bar, restaurant, or other private or public facility, etc.

In the case where a portable telephone platform is used to implement the portable metering device 136, the portable metering device 136 may be configured to operate in accordance with any wireless communication protocol such as, but not limited to, a code division multiple access (CDMA) based communication protocol, a time division multiple access (TDMA) based communication protocol, a global system for mobile communication (GSM) based communication protocol, a general packet radio services (GPRS) based communication protocol, an enhanced data GSM environment (EDGE) based communication protocol, a universal mobile telephone service (UMTS) based communication protocol or any other suitable wireless communication protocol. As will be appreciated by persons of ordinary skill in the art, the communication capabilities of the portable telephone may be used to enable communication of data from the portable metering device 136 to the central data collection facility 140 via the network 142. Using a portable telephone to implement the portable metering device 136 enables the audience member 128 to meet the research compliance requirements more easily and more conveniently. Specifically, the audience member 128 may already carry a portable telephone on a regular basis such that carrying a portable metering device 136 implemented using a cellular telephone does not place any additional duties upon the audience member 128 that the household member 128 does not already perform. Alternatively, other hardware/software platforms such as, for example, a personal data assistant (PDA) or handheld computer may be used to implement the portable metering device 136. To ensure that the PDA can detect codes embedded in the media signals it receives, the PDA preferably includes a microphone having automatic gain control as do a number of PDA's currently available on the market.

The audience measurement system 100 may be configured so that the base metering device 132 is adapted to be the primary source to collect all in-home media consumption data and the portable metering device 136 is used as the primary source to collect all out-of-home media consumption data. In yet another example, the base metering device 132 may meter all in-home media consumption, and the portable metering device 136 may meter all in-home and out-of-home media consumption and duplicate consumption data sets collected for in-home consumption may be compared and processed to ensure that such data is credited to reflect only a single consumption (e.g., viewing, listening, etc.) The redundant sets of data may also be used to identify discrepancies between the data and to eliminate data believed to be erroneous.

In yet another example, the audience measurement system 100 may be configured so that the base metering device 132 detects the presence and absence of the portable metering device 136 and uses that information to determine whether metering is necessary. For example, if the base metering device 132 determines that the television 118 is turned on but there is no portable metering device 136 located in the viewing area, then the base metering device 132 may begin metering the programming delivered via the television 118. Conversely, if the base metering device 132 detects the portable metering device 136 in the consumption area (e.g., a room) 112, then the base metering device 132 may halt monitoring.

In another example, if the base metering device 132 detects the portable metering device 136 in the consumption area 112, then the base metering device 132 may halt monitoring and begin emitting a base signal detectable by all portable metering devices 136 located in the consumption area 112. The portable metering device 136 may respond to the base signal emitted by the base metering device 132 by causing the subsequently collected data to be identified or tagged as in-home consumption data, thereby allowing data collected via the portable metering device 136 in connection with in-home media consumption to be distinguishable from data collected by the portable metering device 136 in connection with out-of-home media consumption. The portable metering device 136 may continue to identify data collected as being in-home consumption data until the base signal is no longer detected by the portable metering device 136 (i.e., the portable metering device 136 has been removed from the consumption area 112). Alternatively, the base metering device 132 may emit the signal only periodically and the portable metering device 136 may be adapted to identify data that is subsequently collected over a predefined time period as being associated with in-home consumption, wherein the predefined time period is related to the periodicity at which the base metering device 132 emits the signal.

In yet another example, the base metering device 132 may be replaced with a device that does not perform any metering functions but, instead, is only capable of generating a base signal to be received by the portable metering device 136 (and any other portable metering devices) located in the consumption area 112. These signal generating devices may be adapted to generate base signals for capture by the portable metering device 136 located in the consumption area 112, and the portable metering device 136 may be adapted to use the base signals to identify data that is collected in connection with in-home consumption (e.g., viewing, listening, etc.). Of course, in such an embodiment, the portable metering device 136 and other substantially similar or identical portable metering devices are the sole metering devices and, therefore, the audience members' willingness to carry the portable devices assigned to them is critical to the accuracy and completeness of the data collected thereby.

The base metering device 132 may be adapted to detect the presence of one or more portable metering devices such as the portable metering device 136 in the consumption area 112 through the use of a short range signal transmitter/receiver disposed in the base metering device 132 and a short range signal transmitter/receiver disposed in the portable metering device 136. The short range signals transmitted between the base metering device 132 and the portable metering device 136 may be, for example, infrared signals, radio frequency signals, ultrasonic signals, etc., and may be adapted to provide information that identifies the audience member 128 assigned to carry the portable metering device 136. The short range signals may further be adapted to provide information about whether the short range signal originated from the portable metering device 136.

Figure 2:
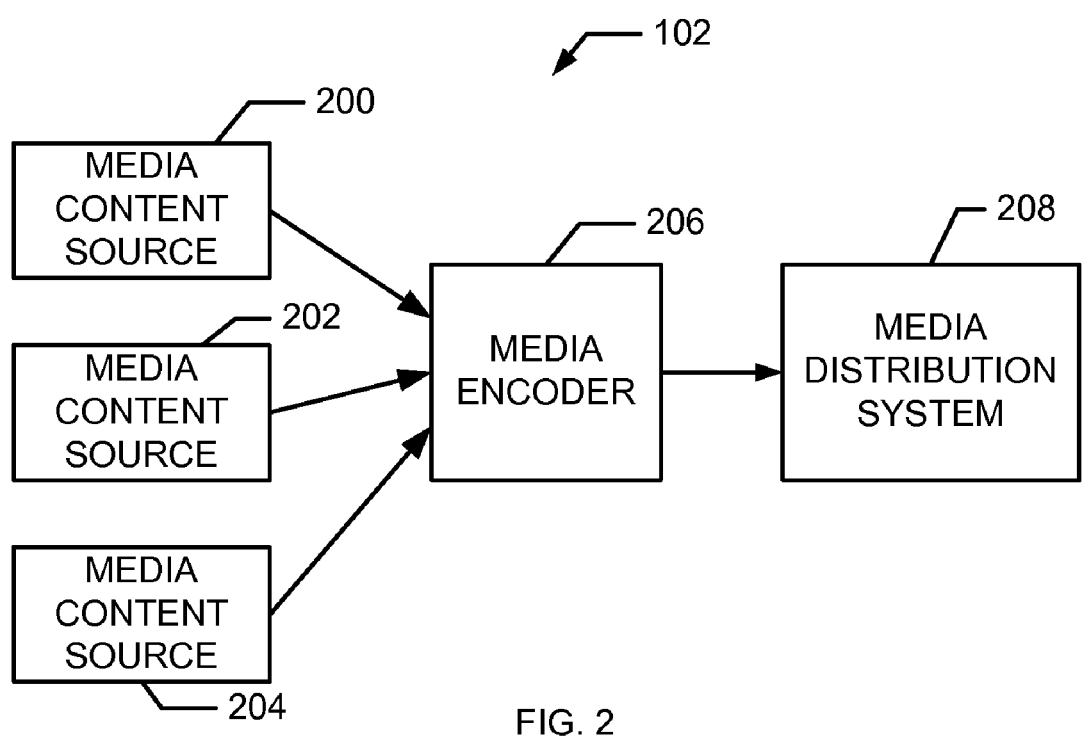
FIG. 2 is a block diagram of an example configuration of the media service provider of FIG. 1.

Now turning to FIG. 2, a block diagram depicts an example manner in which the media service provider 102 may be configured. In the example configuration of FIG. 2, the media service provider 102 includes a plurality of media content sources 200, 202 and 204, a media encoder 206 and a media distribution system 208, all of which may be operatively coupled as shown. The media content sources 200, 202 and 204 may provide audio/video program content such as, for example, television programs, radio programs, still images, web site pages, software or other machine executable instructions, advertisements, video clips, etc. Each of the media content sources 200, 202 and 204 may provide a single type of media content or, alternatively, multiple types of media content in one or more signals or data streams. Preferably, the media content sources 200, 202 and 204 provide digital data streams to the media encoder 206. In that case, the media encoder 206 does not have to convert the media signals it receives from the media content sources 200, 202 and 204 into digital information. However, in the case where the media encoder 206 receives one or more analog signals from one or more of the media content sources 200, 202 and 204, then the media encoder 206 includes an analog-to-digital converter to convert the media signals into digital data streams prior to further processing.

In contrast to known media encoders, the media encoder 206 is configured to vary the manner in which it encodes media signals received from the media content sources 200, 202 and 204 based on the type of the media signal that is being encoded. In some examples, as described in greater detail below, the media encoder 206 may insert relatively strong and/or relatively weak codes depending on the type of media signal into which it is inserting or otherwise embedding the codes. For example, in the case of media signals containing radio programs, relatively strong codes may be inserted by the media encoder 206 to facilitate subsequent detection of these codes in the relatively loud acoustic environments and over the greater distances through which a listener typically consumes a radio program. The media encoder 206 may generate and insert stronger codes by increasing the amplitude and/or spectral power of the encoding frequency or frequencies associated with the inserted codes. Additionally or alternatively, stronger codes may be inserted by increasing the rate at which codes are inserted into the media signal or data stream (i.e., the encoding density).

In some examples, the media encoder 206 may insert relatively strong codes into media signals associated with radio programs and relatively weak codes into media signals associated with television programs. In other examples, the media encoder 206 may insert both strong and weak codes into all media signals, regardless of the type of the signal into which the codes are inserted. In the case where both strong and weak codes are inserted into a media signal, as noted below, subsequent detection of only strong codes in the media signal may be used to indicate that the consumption of that media signal is occurring out-of-home, or that the detected signal is originating from another room of a household in which the audience member is not currently present (i.e., the signal is spilling over).

In still other examples, the media encoder 206 may be configured to insert different types of codes that are specifically suited for the particular needs of a medium (e.g., CBET for radio) Additionally or alternatively, the media encoder 206 may use a two-stage code insertion scheme in which a first stage code indicates the source type of the media signals (i.e., whether the media signal is a radio signal, an over-the-air radio frequency broadcast television signal, a cable television signal, etc.). A second stage code may also be inserted based on one or more of the above-noted techniques such as, for example, inserting strong and/or weak codes based on the type of the signal being transmitted.

The encoded media signals output by the media encoder 206 are transmitted to audience members' homes and other consumption sites via the media distribution system 208. The media distribution system 208 may be implemented as a known head-end transmission station and, thus, may include radio frequency transmitters in the case where the media service provider 102 is a radio frequency television station, satellite uplink devices in the case where the media service provider 102 is a satellite-based broadcaster, etc.

Figure 3:
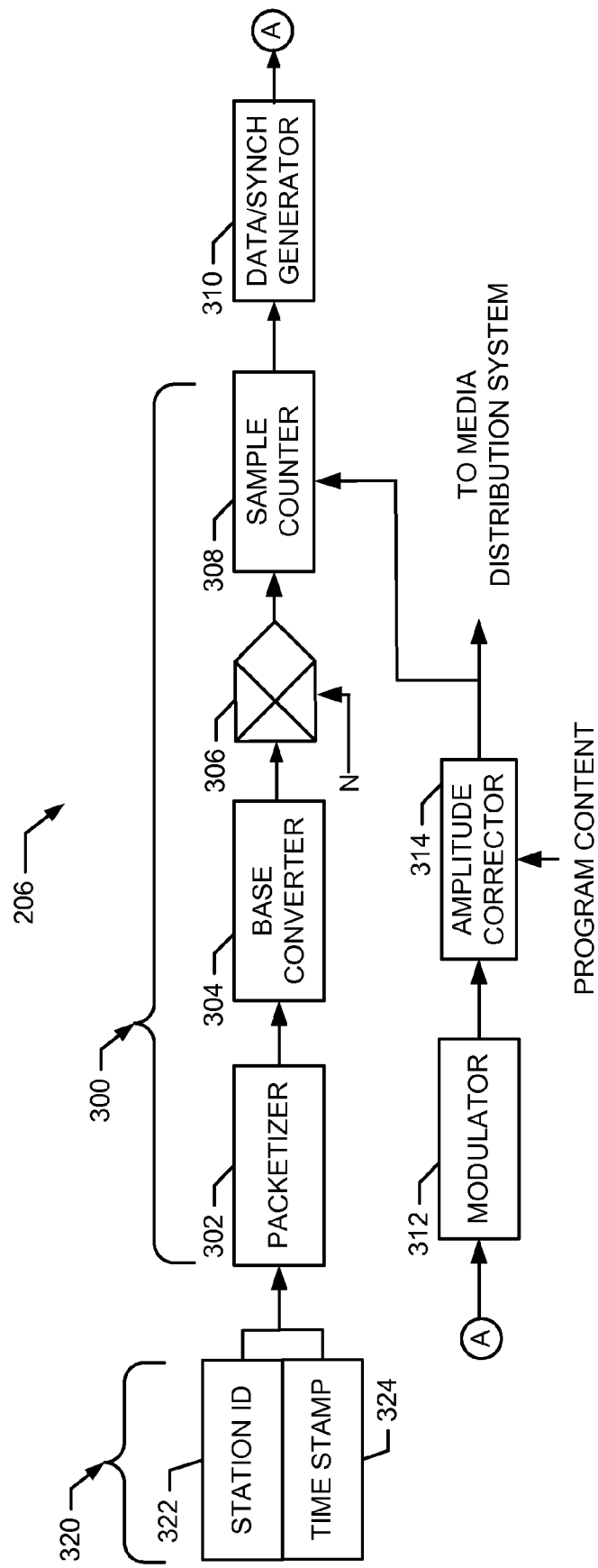
FIG. 3 is a block diagram of an example encoder that may be used to implement the media encoder of FIG. 2.

FIG. 3 is a block diagram of an example encoder architecture that may be used to implement the media encoder 206 of FIG. 2. As shown in FIG. 3, a code generator 300 includes a packetizer 302, a base converter 304, a multiplier 306 and a sample counter 308. The code generator 300 further includes a data/synch generator 310, a modulator 312 and an amplitude corrector 314. Input data 320, which may, for example, include a source or station identifier (ID) 322 and a time stamp 324, are coupled to the packetizer 302. In one example, the station ID 322 may be a 16-bit binary value and the time stamp may be a 32-bit binary value denoting the actual time at which the station ID was inserted at the media service provider 102.

In operation, the packetizer 302 receives the input data 320, which may be, for example, 48 bits in length (wherein the station ID 322 is 16 bits long and the time stamp 324 is 32 bits long), and converts the input data 320 into a number of 12-bit packets. For example, if the input data 320 is 48 bits in length, the packetizer 302 segments the 48 bits into four, 12-bit packets.

The 12-bit packets are coupled to the base converter 304, which converts each of the 12-bit packets from a binary value into a decimal value. For example, the four, 12-bit packets are converted into four decimal values of $d_0$, $d_1$, $d_2$, $d_3$. The decimal value of each 12-bit packet determines the separation between sets of spread spectrum markers. The separation between the sets of markers may be detected by the portable metering device 136 of FIG. 1 and used to recover the information encoded by the encoder 206.

The decimal value of each 12-bit packet is coupled to the multiplier 306, which multiplies each decimal value by a factor N to determine the number of samples or corresponding time period between markers. In one example, the value of N is 16 and, therefore, a decimal value of $d_x$, incremented by 1, is multiplied by a factor of 16 to yield a value of $16(d_x+1)$. The value of N could, of course, be selected to have another value. The multiplication is performed to allow for jitter in the transmission and decoding processes carried out down stream of the code generator 300. In the disclosed example, the maximum sample count corresponding to a 12-bit decimal value of 2047 which, if the multiplication factor N is 16, yields a value of 32,768. Accordingly, 32,768 samples would occur between markers in the case of encoding a decimal value of 2047. Alternatively, in this case, a maximum time of 0.68 seconds may elapse between markers if the samples are taken at 48 KHz.

Each of the four multiplied decimal values is provided to the sample counter 308 along with the output from the amplitude corrector 314. The sample counter 308 periodically enables the data/synch generator 310 to output a pseudonoise ("PN") sequence to be embedded into audio information. The periodicity with which the sample counter 308 enables the data/synch generator 310 is dictated by the output from the multiplier 306 and the number of samples output from the amplitude corrector 314. For example, if the decimal number output by the multiplier 306 is 32,768, the sample counter 308 counts the number of samples output from the amplitude corrector 314 and, when number of samples received by the sample counter 308 reaches 32,768 since the last marker, the sample counter 308 outputs an enable signal to the data/synch generator 310. Alternatively, the sample counter 308 may function as a timer. In such a case, the enable signal would be output 0.68 seconds after the completion of the output of the prior marker.

In general, the data/synch generator 310 receives the enable signal and, in response to the enable signal, generates a PN sequence representing a data signal or the inverse of a PN sequence representing a synchronization signal. The output of the data/synch generator 310, which may consist of PN sequences of logical ones and logical zeros, is coupled to the modulator 312. In response to the logical ones and logical zeros, the modulator 312 outputs chirps (e.g., audio chirps) formed using samples. The samples output from the modulator 312 are coupled to the amplitude corrector 314. The amplitude corrector 314 receives the program content and processes the program content to determine the amplitude at which the samples should be output to the media distribution system 208 of FIG. 2.

Figure 4:
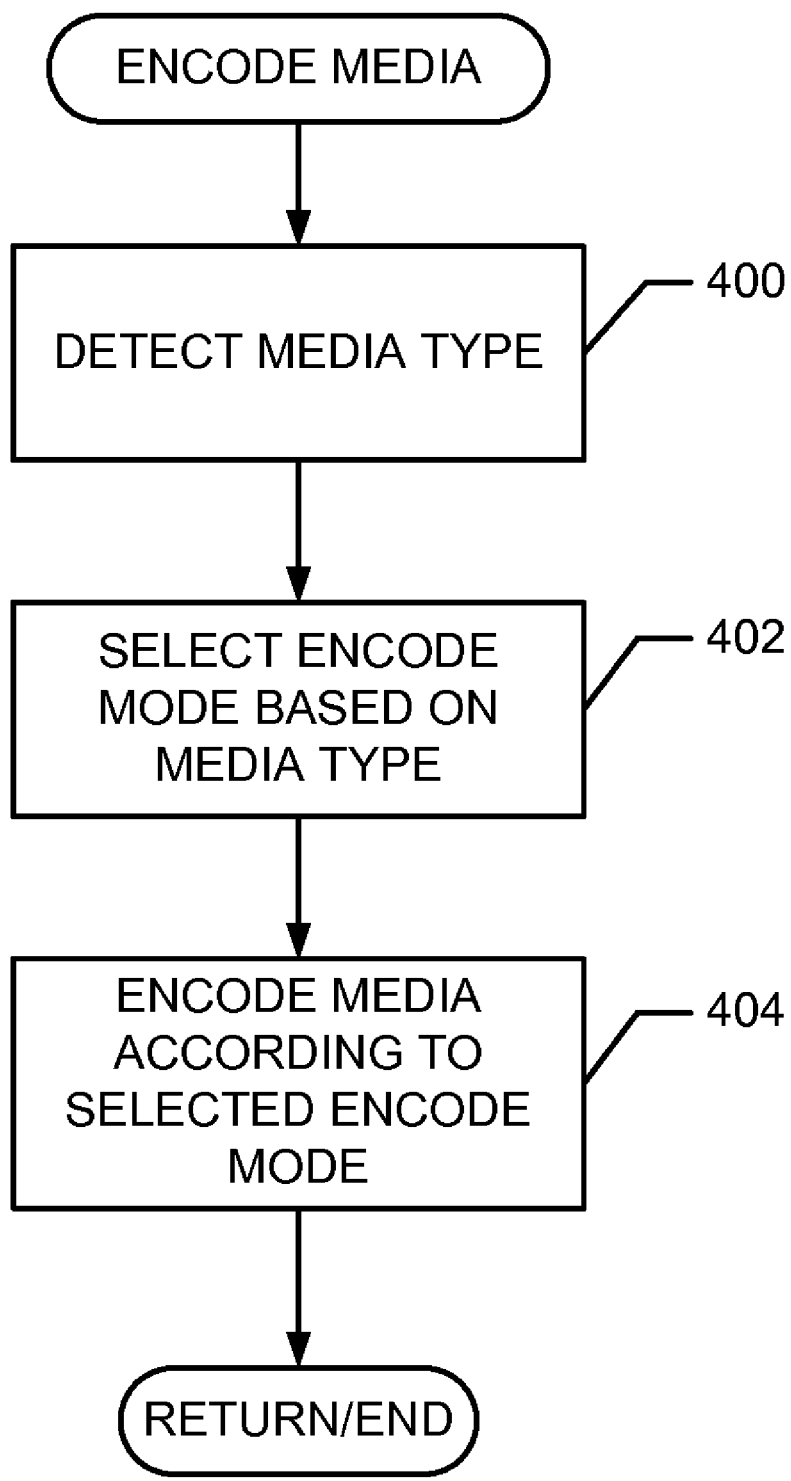
FIG. 4 is a flow diagram depicting an example manner in which the media encoder of FIG. 2 may be configured to selectively encode media.

FIG. 4 is a flow diagram that depicts an example manner in which the media encoder 206 of FIG. 2 may be configured to encode media signals. Initially, the media encoder 206 detects the type (e.g., the source type) of a media signal to be encoded (block 400). As described in greater detail below in connection with FIG. 5, an example method that may be used to detect the media type may be carried out by, for example, examining a source identifying code (e.g., a station identification code) in the media signal and determining, based on the identifying code, whether the media signal is a radio program signal, a television signal, or some other type of media signal.

After the media encoder 206 has determined the type of a media signal to be encoded, the media encoder 206 selects an appropriate encoding mode or scheme based on the type of the media signal (block 402). For example, as described in greater detail below in connection with FIG. 6, the media encoder 206 may encode strong codes or weak codes depending on the media signal type (e.g., television signal, radio signal, etc.) After the encoding mode or scheme has been selected (block 402), the media encoder 206 encodes the media signal (block 404) and conveys the encoded media signal to the media distribution system 208 for transmission.

Figure 5:
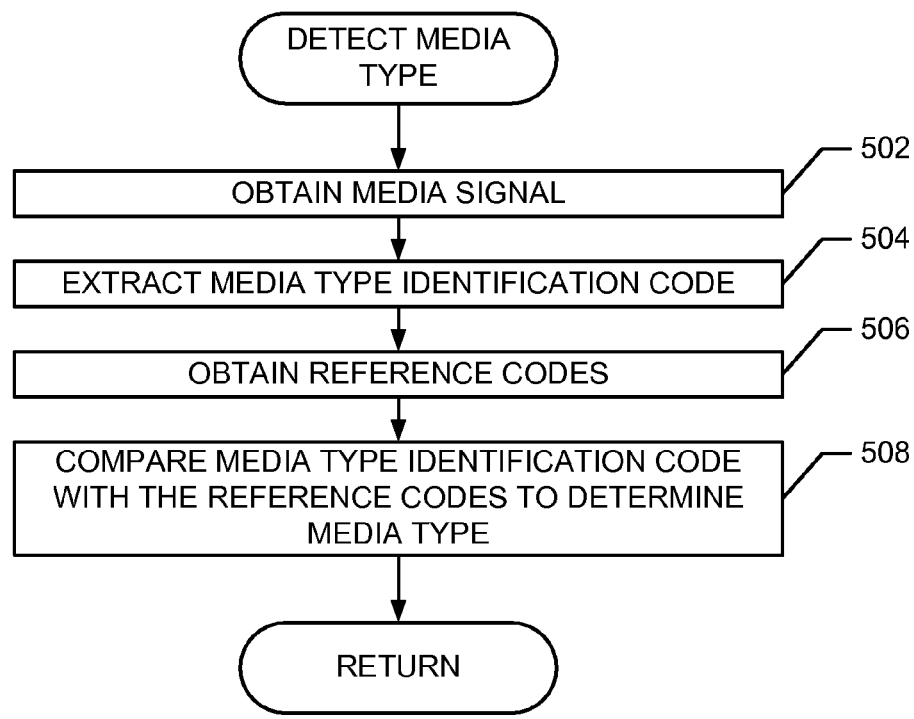
FIG. 5 is a flow diagram of an example method that may be used to detect the type of media to be encoded by the media encoder of FIG. 2.

FIG. 5 is a flow diagram of an example method that may be used to detect the type of media (e.g., television signal, radio signal, etc.) to be encoded by the media encoder 206 of FIG. 2. The example method of FIG. 5 may be used to implement the operations of block 400 described above in connection with FIG. 4. As described above, media type identification codes used to identify media types may be inserted by, for example, the media content sources 200, 202 and 204 (FIG. 2). The media type identification codes may be used by the media encoder 206 to determine the type of media signal that will be encoded so that an appropriate encoding mode may be used to embed or encode codes in the media signal.

Initially, the media encoder 206 obtains a media signal (block 502). The media encoder 206 then extracts a media type identification code from the media signal (block 504) and obtains one or more media type reference codes (block 506). A media type reference code may be compared to media type identification codes embedded in media signals to determine the media types associated with each of the media signals obtained at block 502. For example, the media encoder 206 may include a data repository, look-up table, or database that contains, among other information, a listing of media type reference codes (i.e., source identification reference codes) and their corresponding media types. In this manner, the media encoder 206 can extract media type identification codes from the media signals it receives and compare those codes to the stored media type reference codes to determine the type of a particular media signal to be encoded. The media encoder 206 then compares the extracted media type identification code with each of the reference codes to determine the media type associated with the media signal obtained at block 502 (block 508). After determining the media type, control may be returned to a calling function or process (e.g., the example method of FIG. 4).

Figure 6:
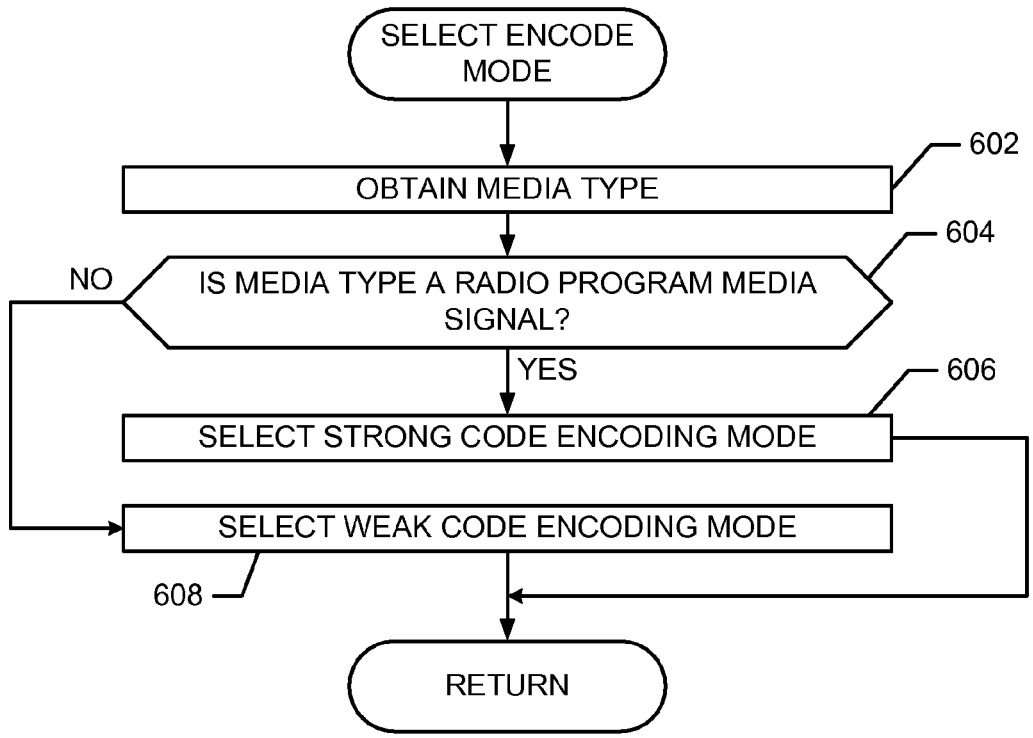
FIG. 6 is a flow diagram of an example method that may be used by the media encoder of FIG. 2 to select an encoding mode for encoding ancillary codes into media signals.

FIG. 6 is a flow diagram of an example method that may be used by the media encoder 206 of FIG. 2 to select an encoding mode for encoding codes into media signals. The example method of FIG. 6 may be used to implement the operation(s) of block 402 of FIG. 4. In particular, the example method of FIG. 6 may obtain the media type from the operation of block 400 and determine the type of encoding mode to be used in encoding or embedding an ancillary code into a received media signal (e.g., the received media signal associated with the operation of block 502 of FIG. 5).

Initially, the media encoder 206 obtains the media type (block 602) and determines if the media type is a radio program media signal (block 604). If the media encoder 206 determines at block 604 that the media type is a radio program media signal, the media encoder 206 selects a strong code encoding mode (block 606) to insert (i.e., embed, encode, etc.) relatively strong codes in the media signal. On the other hand, if the media type is not a radio program media signal, the media type may be a television media signal and the media encoder 206 selects a weak code encoding mode (block 608) to insert relatively weak codes in the media signal. Although only radio program media signal types and television media signal types are described in connection with FIG. 6, the example method of FIG. 6 may be implemented using any other media signal types (e.g., computer information) in place of or in addition to the radio and television media signal types. After selecting the encoding mode, control may be returned to a calling function or process (e.g., the example method of FIG. 4).

Figure 7:
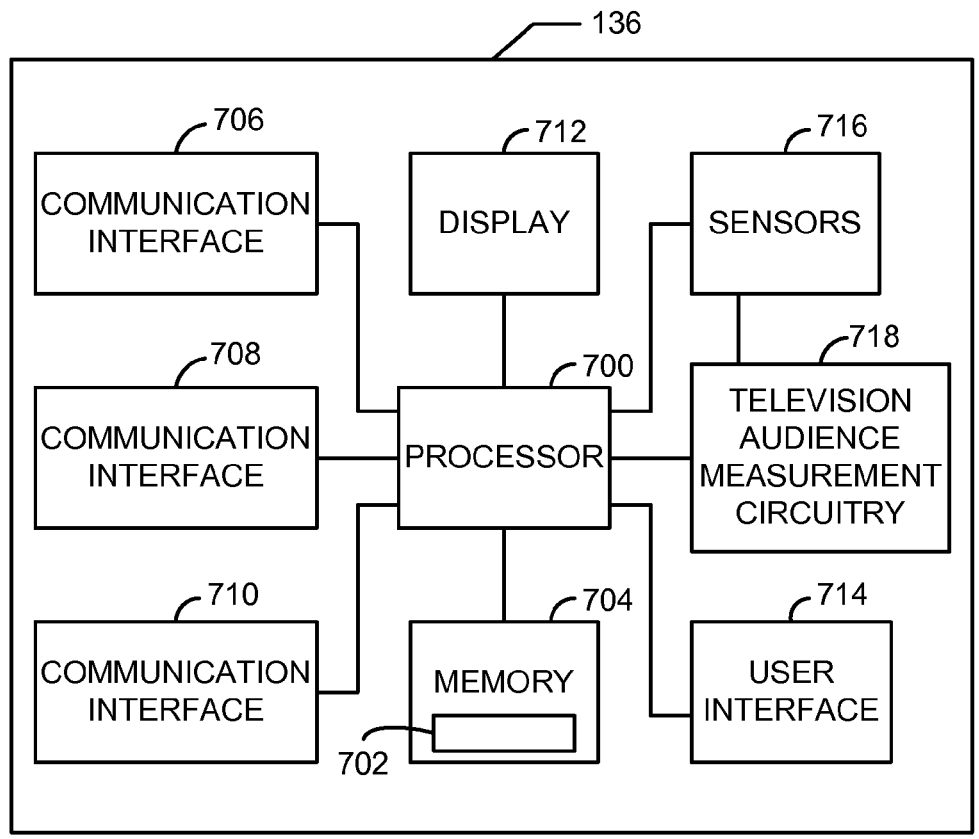
FIG. 7 is a block diagram of an example manner in which the portable metering device of FIG. 1 may be implemented.

Referring now to FIG. 7, in one example, the portable metering device 136 may be equipped with a processor 700 that executes a set of instructions 702 stored in a memory 704 to control the operation of the portable metering device 136 in a manner that enables the functionality described herein. The program or the set of machine readable instructions 702 may be embodied in a machine-readable medium such as a programmable gate array, an application specific integrated circuit (ASIC), an erasable programmable read only memory (EPROM), a read only memory (ROM), a random access memory (RAM), a magnetic media, an optical media and/or any other suitable type of medium.

The portable metering device 136 may also include a first communication interface 706 that allows communication between the portable metering device 136 and the remotely located central data collection facility 140 (FIG. 1), a second communication interface 708 that enables the transfer of viewing or media consumption data between the base metering device 132 (FIG. 1) and the portable metering device 136 (FIG. 1), a third communication interface 710 that enables the communication of identification information between the base metering device 132 and the portable metering device 136, a display 712, a user interface 714, one or more sensors 716 for detecting signals emitted by media delivery devices, and circuitry 718 to perform any of the methods of audience measurement that involve capturing and processing audio codes and/or audio signatures from an audio signal emanating from a media delivery device (e.g., the televisions 118, 120 and 122, the radios 124 and 126, etc.)

As will be appreciated by persons of ordinary skill in the art, there are a variety of well-known possible configurations for the circuitry 718 to enable television audience measurement methods that involve capturing and processing audio codes and/or audio signatures. As a result, further detail regarding such circuitry is not provided herein. In addition, the memory 704 may be supplemented with one or more storage cards (not shown) in which data may be temporarily stored, or cached, before the data is transmitted by one or more of the communication interfaces 706, 708 and 710 to thereby compensate for any bandwidth limitations associated with the communication capabilities of the portable metering device 136.

The display 712 is operatively coupled to the processor 700 and may be implemented using a light emitting diode (LED) display, a liquid crystal display (LCD), or any other suitable display configured to present visual information, such as data indicating the operation of the processor 700. For example, the display 712 may indicate that the audience member 128 has logged in, and/or may identify the programming content carried by the channel selected by the audience member 128, may identify whether the audience member 128 is currently consuming media in-home (i.e., within the household 110) or outside the household 110, etc.

The user interface 714 may be used by the audience member 128 to enter data and commands into the portable metering device 136. For example, the user interface 714 may be implemented using a keyboard, a mouse, a track pad, a track ball, and/or a voice recognition system. Although the display 712 and the user interface 714 are shown as separate components, the display 712 and the user interface 714 may instead be integrated into a single component such as, but not limited to, a touch-sensitive display configured to enable interaction between the audience member 128 and the portable metering device 136.

One of the sensors 716 disposed in the portable metering device 136 may be adapted to sense when the portable metering device 136 is in proximity to a media delivery device such as, for example, a television in accordance with the system disclosed in U.S. patent application Ser. No. 10/125,577. For example, the sensors 716 may include an audio sensor such as a condenser microphone, a piezoelectric microphone or any other suitable transducer configured to convert acoustic waves into electrical signals. Further, the audio sensor may be configured to detect a 15.75 kilo-hertz (kHz) horizontal scan fly-back transformer sweep signal to determine whether a conventional television is turned on and/or may be configured to detect a sweep signal having a frequency of 31.50 kHz to detect whether a high-definition television (or other line-doubled television) is operating. Upon detecting such a frequency signal, the sensors 716 provide an indication to the processor 700, which may respond to the signal by causing the circuitry 718 to collect viewing or consumption data. In the absence of an indication that the portable metering device 136 is proximate to an operating media delivery device (e.g., a television), the portable metering device 136 may cause the circuitry 718 to stop collecting viewing or consumption data.

The sensors 716 may include multiple audio transducers (e.g., microphones), each of which may be suited to detect audio codes in a particular type of media signal. For example, one of the sensors 716 may be a microphone having a transfer function (i.e., a gain curve or sensitivity over a range of frequencies) particularly well-suited to detect codes inserted in media signals containing radio programs. Additionally, another one of the sensors 716 may be a microphone having a transfer function particularly well-suited to detect codes inserted in media signals containing television programs. In the case where the portable metering device 136 has multiple microphones, the processor 700 may be programmed to selectively use the microphones to more effectively detect codes within media signals containing radio programs, television programs, etc.

In addition to the instructions 702, the memory 704 within the portable metering device 136 may also include source (e.g., station) identification code information. In one embodiment, the portable metering device 136 may use the stored source identification code information to determine whether detected codes are valid or good codes. For example, the portable metering device 136 may compare detected codes to the known good codes stored in the memory 704 and, if a match is found, the detected code information resulting in the match is stored within the portable metering device 136 for subsequent analysis and/or transfer to the base metering device 132 and/or the central facility 140. On the other hand, if a detected code does not match the known good codes stored in the memory 704, the detected code information may be discarded or otherwise rejected.

Figure 8:
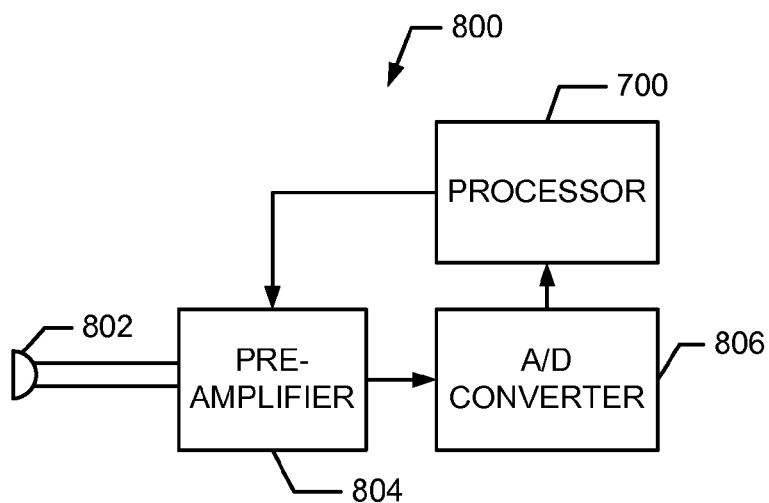
FIG. 8 is a block diagram of an example automatic gain control circuit that may be used with the portable metering device of FIG. 1.

FIG. 8 is a block diagram of an example automatic gain control (AGC) circuit 800 that may be part of the circuitry 718 (FIG. 7). As shown in FIG. 8, the AGC circuit 800 includes a microphone 802, a pre-amplifier 804 and an analog-to-digital (A/D) converter 806, all of which may be operatively coupled as shown. In general, the processor 700 may monitor, via the A/D converter 806, a characteristic of the signal(s) (e.g., a media signal) received by the microphone 802 and amplified by the pre-amplifier 804. In particular, the processor 700 may monitor peak amplitudes, a spectral power characteristic, signal envelope characteristics, etc. to ensure that the signal it receives is optimally amplified to facilitate detection of codes. The processor 700 may vary a characteristic of the AGC circuit 800 such as, for example, a gain of the pre-amplifier 804, to ensure that media signals received by the microphone 802 are sufficiently amplified and to prevent signal clipping and other distortions that could adversely impact the accurate detection and identification of codes.

Figure 9:
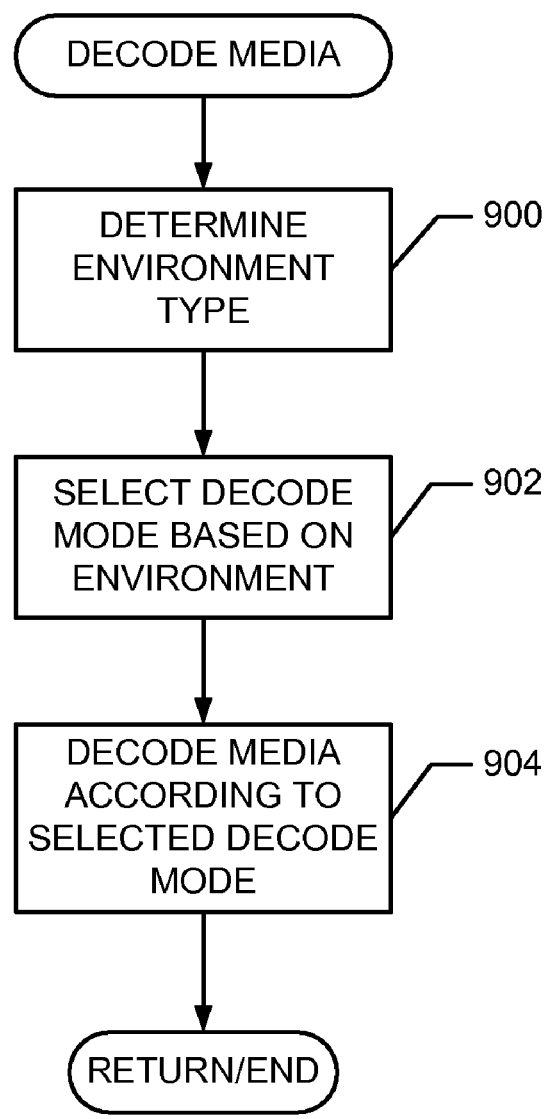
FIG. 9 is a flow diagram of an example manner in which the portable metering device of FIG. 1 may be configured to selectively decode media.

FIG. 9 is a flow diagram depicting an example manner in which the portable metering device 136 may be configured to vary its decoding mode based on its current environment. Initially, the portable metering device 136 determines the type of environment in which it is currently located (block 900). For example, the portable metering device 136 may determine whether it is in-home (e.g., within the household 110) or out-of-home (e.g., within the automobile 138 or some other out-of-home environment). As described in greater detail below in connection with FIG. 10A, the portable metering device 136 may determine the nature or type of its monitoring environment based on acoustic characteristics of the environment, the presence of a signal from, for example, the base metering device 132, and/or characteristics of the codes extracted from the audio signals.

After the portable metering device 136 has determined the nature or type of monitoring environment in which it is located, the portable metering device 136 selects a decoding mode suitable for that environment (block 902). As described in greater detail below in connection with FIG. 11, the portable metering device 136 may use a variable threshold decoding mode or a frequency of code occurrence decoding mode to decode and analyze codes in received audio signals. Once the decoding mode has been selected by the portable metering device 136 at block 902, the portable metering device 136 decodes the media signals it receives accordingly (block 904).

Figure 10A:
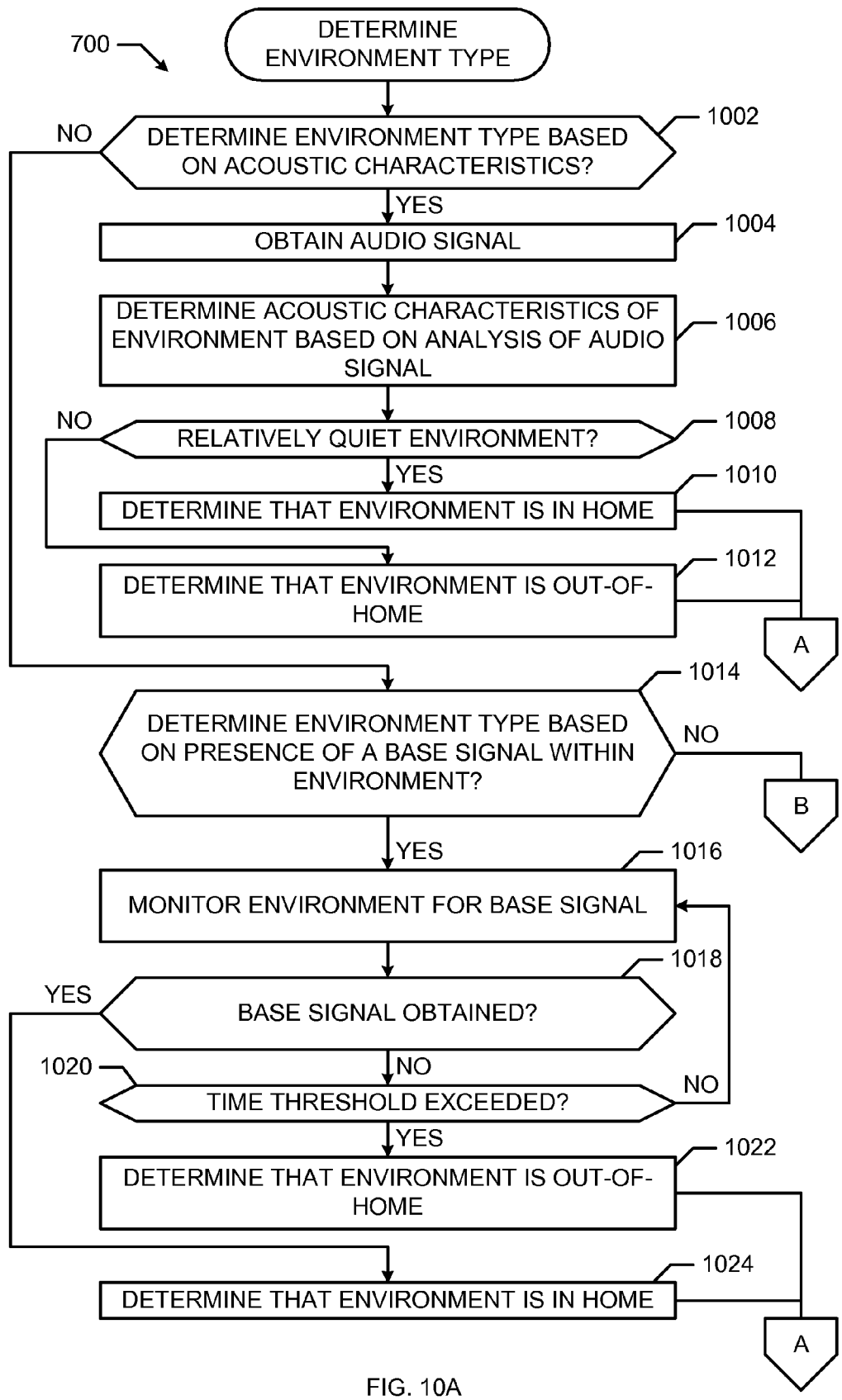
FIGS. 10A and 10B are flow diagrams of an example manner in which the portable metering device of FIG. 1 may determine a type of environment in which it is located.
Figure 10B:
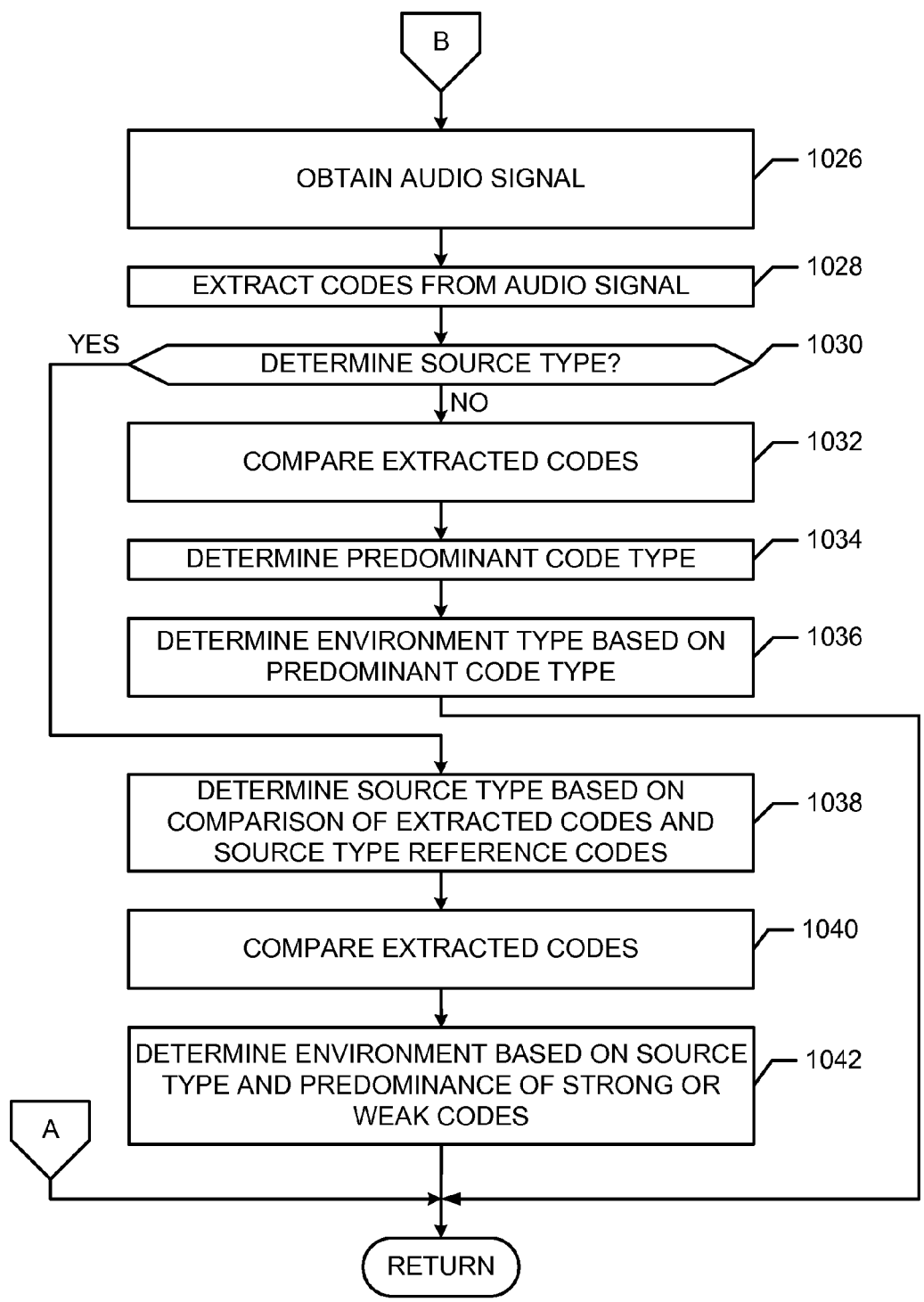

FIGS. 10A and 10B are flow diagrams of an example method that may be used by the portable metering device 136 of FIG. 1 to determine a type of environment in which it is located. The example method of FIGS. 10A and 10B may be used to implement the operation(s) of block 900 described above in connection with FIG. 9. Initially, the portable metering device 136 determines whether it should determine the nature or type of monitoring environment within which it is located based on acoustic characteristics of the environment (block 1002). Specifically, the portable metering device 136 may detect or obtain audio signals within an environment and assess the acoustic characteristics of the environment based on the detected audio signals. The portable metering device 136 may make the determination at block 1002 based on a predetermined preference to attempt to first determine the environment type based on acoustic characteristics. Alternatively, the portable metering device 136 may make the determination at lock 1002 based on use history of the portable metering device 136. For example, if the portable metering device 136 is used most often in a variety of environments that typically do not provide base signals and/or which exhibit varying or unpredictable acoustic characteristics, the portable metering device 136 may determine the environment type based on acoustic characteristics.

If the portable metering device 136 at block 1002 determines that it will determine the environment type based on acoustic characteristics, the portable metering device 136 obtains an audio signal (block 1004). For example, the portable metering device 136 may detect an audio signal via the sensors 716 (FIG. 7).

The portable metering device 136 then analyzes the detected audio signal to determine the acoustic characteristics of the environment (block 1006). For example, the portable metering device 136 may use the circuitry 718 (FIG. 7) to examine the spectral characteristics of the environment based on the detected audio signal and determine if the environment is relatively quiet or loud. Additionally or alternatively, the portable metering device 136 may determine if the environment produces echo, attenuates certain frequencies, or includes audio that is uniquely associated with indoor or outdoor environments.

If the portable metering device 136 uses the acoustic characteristics to differentiate between relatively quiet environments and relatively loud environments, the portable metering device 136 may then determine if the acoustic characteristics indicate a relatively quiet environment (block 1008). If the acoustic characteristics indicate a relatively quiet environment, the portable metering device 136 determines that it is in an in-home environment (block 1010). On the other hand, if the portable metering device 136 determines that the acoustic characteristics do not indicate a relatively quiet environment (block 1008), the portable metering device 136 determines that it is in an out-of-home environment (block 1012). In either case, after the portable metering device 136 determines which type of environment within which it is located, the process returns control as indicated in FIG. 10B to, for example, a calling function or method (e.g., the example method described above in connection with FIG. 7).

If the portable metering device 136 does not determine the environment type based on the acoustic characteristics of the monitoring environment, the portable metering device 136 determines the nature of the monitoring environment or the environment type based on the presence or absence of a base signal within the monitoring environment (block 1014). In this case, the portable metering device 136 monitors for the presence of a base signal within the monitoring environment (block 1016) via, for example, the sensors 716 (FIG. 7). More specifically, signal emission units such as, for example, the base metering device 132 (FIG. 1), may be placed in some monitoring environments (e.g., the environments 112, 114, and 116 within the household 110 of FIG. 1) and configured to emit base signals that can be detected and identified by the portable metering device 136. For example, as noted above, the base metering device 132 may be configured to periodically or continuously emit a base signal that, when received by the portable metering device 136, is indicative of an in-home monitoring environment. Thus, when the portable metering device 136 is located within an out-of-home monitoring environment the signal transmitted by the base metering device 132 is not detected, thereby causing the portable metering device 136 to recognize that it is within an out-of-home environment.

The portable metering device 136 then determines if it has obtained a base signal (block 1018). If the portable metering device 136 has not obtained a base signal, it determines if the amount of time that has lapsed since obtaining the last base signal exceeds a time threshold (block 1020). A time threshold value may be used to indicate the amount of time that lapsed since obtaining a prior base signal before the portable metering device 136 determines that it is in an out-of-home environment. The time threshold value may be initialized or set during a power-up sequence of the portable metering device 136 or during any other suitable time.

If the portable metering device 136 determines at block 1020 that the amount of time that lapsed since obtaining the previous base signal does not exceed the time threshold value, the portable metering device 136 continues to monitor the environment for the base signal. However, if the portable metering device 136 determines that the amount of lapsed time does exceed the time threshold value, the portable metering device 136 determines that it is within an out-of-home environment (block 1022). The portable metering device 136 may then tag all subsequently received audio signals as out-of-home signals or may be configured to handle all subsequently received audio signals differently than audio signals received when the portable metering device 136 is within an in-home environment.

If at block 1018 the portable metering device 136 determines that it has obtained a base signal, then the portable metering device 136 determines that it is within an in-home environment (block 1024). Following the operations of blocks 1022 and 1024, control is returned as indicated in FIG. 10B to, for example, a calling function or operation (e.g., the example method described above in connection with FIG. 7).

If at block 1014 the portable metering device 136 decides to not determine the environment type based on the presence of a base signal, then the portable metering device 136 determines the environment type based on codes embedded in audio signals as described below in connection with the flow diagram of FIG. 10B. Specifically, in some examples, the portable metering device 136 may determine the nature of the monitoring environment or the environment type by examining the characteristics of the codes it extracts from media signals.

As shown in FIG. 10B, the portable metering device 136 obtains an audio signal (block 1026). The portable metering device 136 then extracts codes from the audio signal (block 1028). After obtaining the codes from the audio signal, the portable metering device 136 decides whether to determine the source type from which the audio signal is emitted (block 1030). The decision to determine the source type at block 1030 may be based on a predetermined preference or requirement, historical usage of the portable metering device 136, or in any other desired manner. If the portable metering device 136 decides to not determine the source type, the portable metering device 136 compares the extracted codes (block 1032) and determines which code type (e.g., strong code type or weak code type) is predominant (block 1034). For example, in a case where both strong and weak codes are inserted in media signals by the media service provider 102, the portable metering device 136 may make relative comparisons of the strong and weak codes. The portable metering device 136 may then use the comparisons to determine if strong codes are predominant or if weak codes are predominant.

The portable metering device 136 may then determine the environment type within which it is located based on the predominant code type (block 1036) determined at block 1034. For example, if primarily strong codes are detected (i.e., weak codes are relatively scarce), the portable metering device 136 may determine that it is in an out-of-home monitoring environment.

If at block 1030 the portable metering device 136 decides to determine a source type (e.g., a television, a radio, etc.) from which the audio signals are emitted, control is passed to the operations of blocks 1038, 1040, and 1042. The operations of blocks 1038, 1040, and 1042 enable the portable metering device 136 to determine the environment type based on a source type and a predominant code type. In this case, the portable metering device 136 may be configured to access one or more known source identification codes (i.e., identification codes that correspond to known media sources). The portable metering device 136 may compare the source identification codes to the codes extracted at block 1028 to determine the type of signal (e.g., whether it is a television signal, a radio signal, etc.) or source type (block 1038).

The portable metering device 136 then compares the extracted codes to determine a predominant code type (e.g., predominantly strong code types or predominantly weak code types) (block 1040). The portable metering device 136 then determines the environment type based on the source type determined at block 1038 and the predominant code type determined at block 1040 (block 1042). For example, if the portable metering device 136 detects primarily strong codes (and inserted weak codes are relatively scarce) and has also determined that the detected strong codes are associated with a television signal (e.g., the source type is a television), then the portable metering device 136 may determine that it is not located in an out-of-home environment but, rather, that it is located in an in-home environment and is receiving an out-of-room television signal. In other words, when located in a room adjacent to a television room, the portable metering device may detect the strong codes but not the weak codes because the strong codes are more likely to propagate through walls while the weak codes are attenuated by the walls. After the operation of block 1042, control is returned to, for example, a calling process (e.g., the example method of FIG. 7). Although the various techniques for determining an environment type described above in connection with FIGS. 10A and 10B are described as being independent, in some implementations two or more of the techniques for determining an environment type may be implemented in combination.

Figure 11:
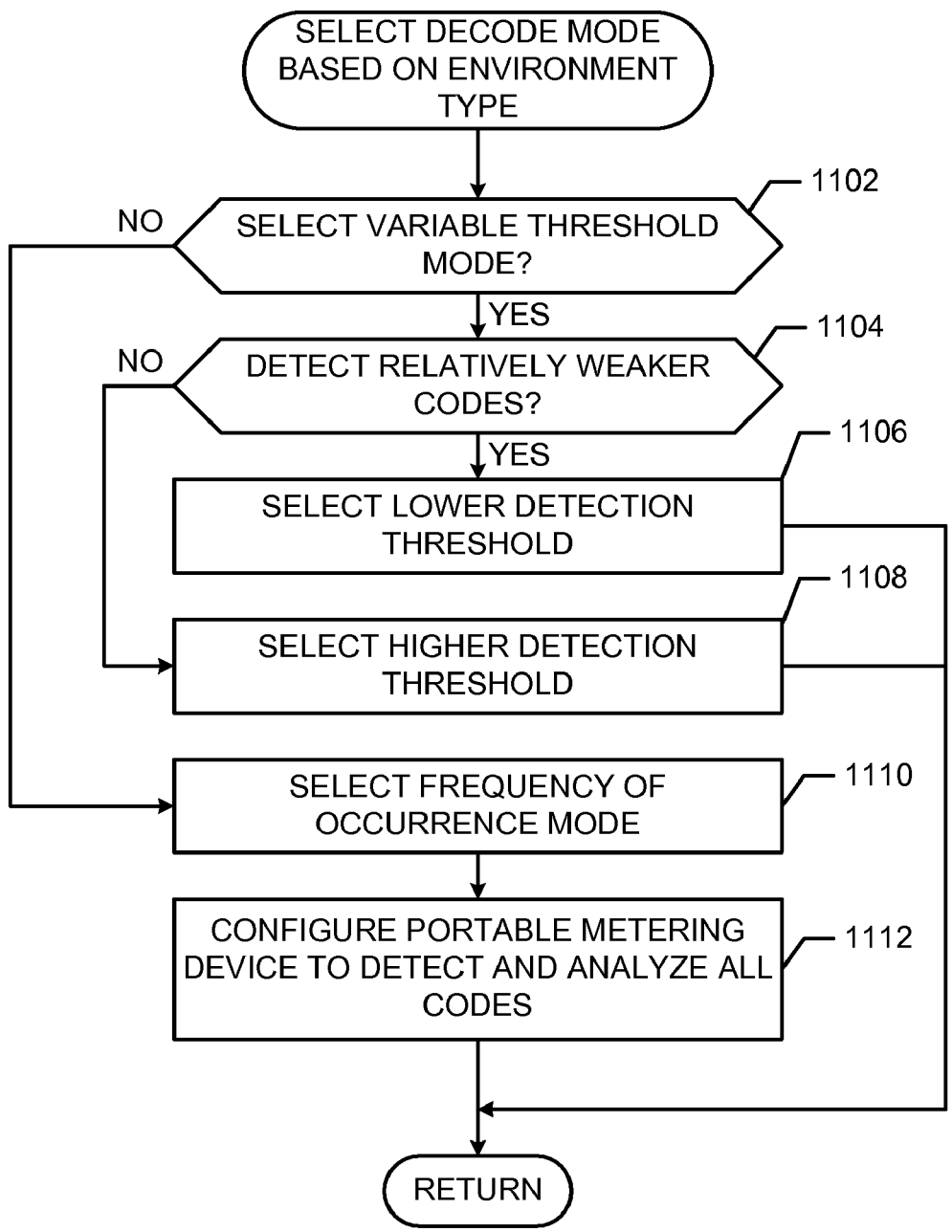
FIG. 11 is a flow diagram of an example method of selecting a decode mode based on an environment type.

FIG. 11 is a flow diagram of an example method that may be used by the portable metering device 136 to select a decode mode based on an environment type. In particular, after the portable metering device 136 determines an environment type within which it is located, the portable metering device 136 may select the type of decode mode to use for that particular environment type. For example, if the portable metering device 136 is in an out-of-home environment, it may select a decoding mode that is suitable for detecting and decoding code types (e.g., strong codes, weak codes, etc.) that are more likely to occur or be of interest in an out-of-home environment. The example method is described below as having a variable threshold decode mode and a frequency of code occurrence decode mode. However, the example method of FIG. 11 may be implemented using any other and/or number of decode modes.

Initially, the portable metering device 136 determines whether to select a variable threshold decode mode (block 1102). A variable threshold decode mode may be implemented by setting a code detection threshold value to specifically detect either strong codes or weak codes or any other code type. For instance, in the case where the encoding scheme employed by the media service provider 102 modulates a characteristic of the media signal at two frequencies to transmit binary information, an amplitude or power at a first frequency may be made relatively larger than an amplitude or power at a second frequency to indicate a binary one. Conversely, a binary zero may be conveyed by causing the amplitude or power at the first frequency to be relatively smaller than the amplitude or power at the second frequency. To detect an encoded binary value, the relative difference between the characteristic at the first and second frequencies may then be compared to a threshold value to determine a code bit (i.e., if a one or zero is being transmitted). Thus, varying the detection threshold value effectively changes the sensitivity of the portable metering device 136 so that a relatively lower detection threshold value enables the portable metering device 136 to detect relatively weaker codes (e.g., codes in which the relative difference between the signal characteristic at the first and second encoding frequencies is relatively small). Likewise, a relatively larger detection threshold causes the portable metering device 136 to reject (or to not detect) relatively weaker codes and, instead, detect primarily stronger codes (e.g., codes in which the relative difference between the signal characteristics at the first and second encoding frequencies is relatively large). The code detection threshold may be varied so that as the portable metering device 136 moves between various environment types the portable metering device 136 can be configured to detect the code type that is characteristic of each of the environment types.

If the portable metering device 136 selects the variable threshold decode mode, then it determines whether to detect relatively weaker codes (block 1104). For example, if the portable metering device 136 determines that it is in an in-home environment (which is typically a television viewing environment), it may use a relatively smaller or lower threshold to detect relatively weaker code bits (i.e., the binary ones and zeros making up the code) embedded within the media signals it receives.

If at block 1104 the portable metering device 136 determines that it will detect relatively weaker codes, then the portable metering device 136 selects a lower detection threshold value (block 1106). However, if the portable metering device 136 determines at block 1104 that will not detect relatively weaker codes, then the portable metering device 136 selects a higher detection threshold (block 1108).

In addition to, or instead of, varying a detection threshold to select or change its decoding mode, the portable metering device 136 may also analyze detected codes to reject or eliminate from subsequent consideration or analyses those codes that are, for example, associated with an out-of-room signal, a signal that is not likely actually being consumed by an audience member, etc. For example, the relative frequency of occurrence of weak and strong codes may be used to assess whether certain codes are associated with signals that are not likely being consumed. If at block 1102 the portable metering device 136 does not select the variable threshold mode, then the portable metering device 136 selects a frequency of occurrence mode (block 1110). The frequency of occurrence mode may be used to determine that a weak code is associated with an out-of-room television signal if the weak code occurs relatively infrequently in comparison to its corresponding strong code (i.e., in a case where media signals are encoded with both strong and weak codes). Codes associated with such out-of-room signals may be eliminated by the portable metering device 136 and, thus, may not be conveyed to the central facility 140 for subsequent analyses and crediting activities. Alternatively, the portable metering device 136 may interpret a situation in which a relatively weak code occurs relatively infrequently compared to its corresponding strong code as reception of a radio signal outside of the home, which may be suitable for subsequent analyses and crediting activities. In that case, the portable metering device 136 may retain such code information and/or convey it to the central facility 140.

After the portable metering device 136 selects the frequency of occurrence mode (block 1110), the portable metering device 136 configures itself (e.g., configures the sensors 716 and the circuitry 718 of FIG. 7) to detect and analyze all types of codes (block 1112). In this manner, the portable metering device 136 can obtain all codes that are emitted to its general location or environment and then analyze the codes to determine which type of code or codes occur more frequently. After the portable metering device 136 is configured to detect and analyze all codes, control is passed back to a calling function or process (e.g., the example method of FIG. 7).

Figure 12:
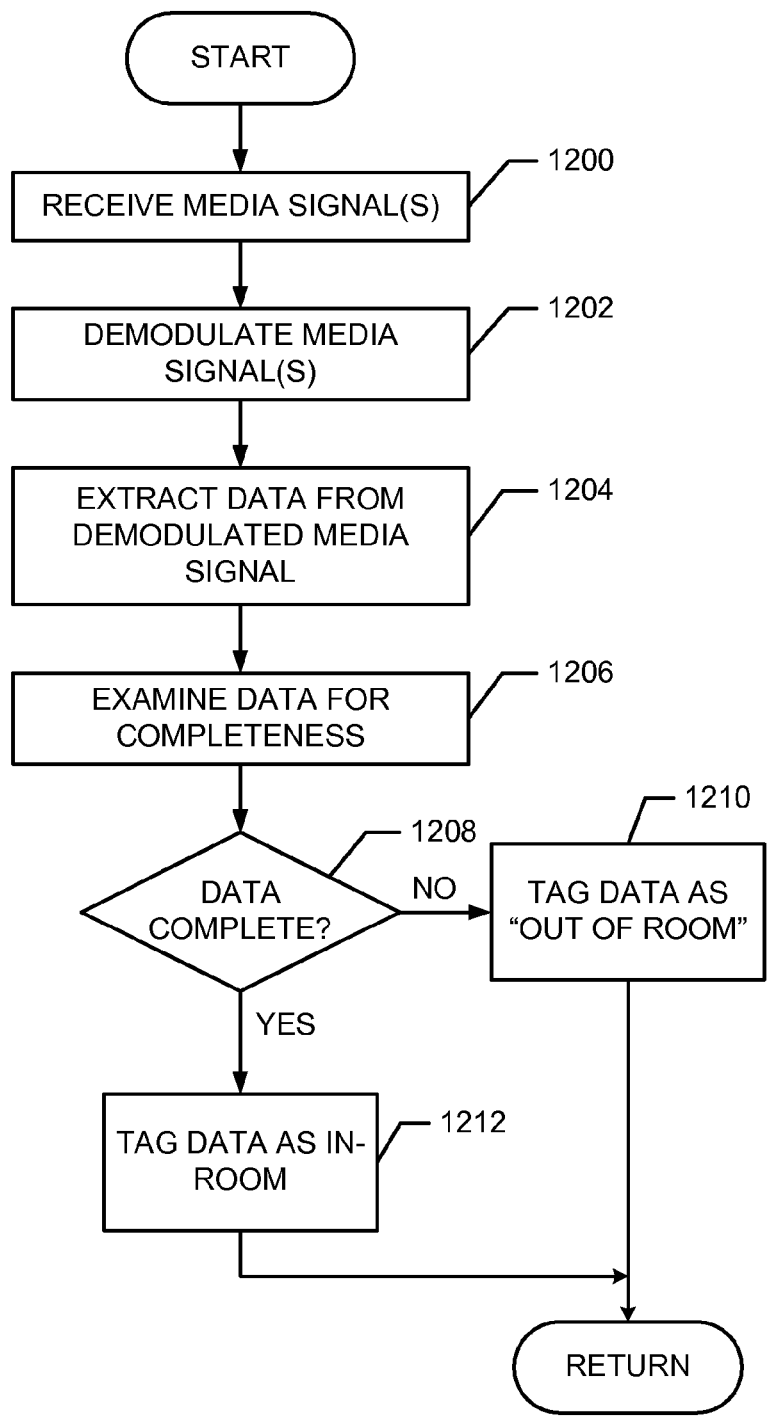
FIG. 12 is a flow diagram depicting a manner in which the portable metering device of FIG. 1 may be configured to tag collected data.

FIG. 12 is a flow diagram depicting an example manner in which the portable metering device 136 may be configured to tag collected data. As described below, the collected data may be tagged as in-room data or out-of-room data so that the collected data may be handled accordingly during subsequent analyses. The example method of FIG. 12 may be adapted to tag collected data as in-home data, out-of-home data, and/or as any other type of data.

Initially, the portable metering device 136 obtains one or more media signals (block 1200) and then demodulates the media signal(s) (block 1202). For example, the circuitry 718 (FIG. 7) may include demodulation circuitry configured to demodulate an audio signal associated with a radio program, television program, etc. The portable metering device 136 then extracts encoded data from the demodulated signal (block 1204). The extracted data is examined to determine whether the extracted data set is complete (block 1206). For example, one or more anticipated data fields may be corrupt or missing completely. If the data set is not substantially complete (block 1208), the data may be tagged as out-ofroom data associated with, for example, a television program (block 1210). Data tagged as out-of-room may not be subsequently conveyed for consideration and/or further analysis to the central facility 140. Alternatively, such out-of-room data may be sent to the central facility 140, but not used for crediting purposes at the central facility 140. On the other hand, if the data set is substantially complete (block 1208), the data set may be tagged as in-room data (block 1212) and, thus, may be forwarded to the central facility 140 for crediting activities. After the data is tagged, control may be returned to a calling function or process or the process of FIG. 12 may be ended.

Alternatively, if the data set is substantially incomplete, as might occur if the data were collected in a particularly noisy environment, the data might be assumed to have been associated with out of home viewing or listening and tagged/processed accordingly. In contrast, if the data set is substantially complete, as might occur if the data were collected in a quieter environment, then the data might be assumed to have been associated with in home viewing or listening and tagged/processed accordingly. To take this example further, in a system in which time stamp information is embedded into the audio signal in a multi-tiered format, e.g., a first tier identifying a date on which the broadcast occurred, a second tier identifying the hour during which the broadcast occurred, and a third tier identifying the minute during which the broadcast occurred, a substantially incomplete data set might include the information conveyed in one and/or two of the tiers during the time period in which data was collected, but exclude some or all of the third tier of information that was emitted during the same time period. Alternatively, a substantially incomplete data set might include some of the information conveyed in each tier but be lacking some of the information conveyed in some or all of the tiers during the time period in which the data was collected. The processing rules/criteria used to determine whether a set of data is substantially complete may be arranged in any desired manner and may take into account the data collection characteristics established using the portable meter under a variety of test conditions that vary in terms of acoustic loudness and other acoustic features.

While the activities described in connection with FIGS. 9 through 12 are described as being conducted primarily by the portable metering device 136, many of those activities can instead be carried out by the central facility 140. For example, the central facility 140 may perform relative comparisons, statistical analyses, etc. of weak and strong codes to determine whether programs associated with codes detected by the portable metering device 136 should be credit as in-room viewing, partial crediting for out-of-home consumption, out-of-home listening (e.g., in the case of radio programs), etc. The central facility 140 may be configured to vary its data editing (e.g., whether data is retained or rejected) and/or crediting rules based on confidence levels assigned to detected codes by the portable metering device 136 or assigned to codes by the central facility 140. The crediting rules may be varied based on the type of media signal associated with a code detected by the portable metering device 136 and sent to the central facility 140. For example, crediting rules may be more stringent for codes associated with television signals as compared to codes associated with radio signals.

In some examples, the portable metering device 136 may not vary many or any of its code detection parameters and, instead, may convey a variety of information such as the relative differences (amplitudes, power levels, etc.) between high and low strength codes, the amplitudes and/or spectral power at encoding frequencies, code density, AGC status, code density information, etc. to the central facility 140 for analysis. The central facility 140 may then perform various statistical and other analyses to credit programs. For example, if the central facility 140 determines that the ratio of weak and strong codes associated with a particular program is about one-to-one, that program may be credited with consumption whether it is a television program or a radio program. On the other hand, if the central facility 140 determines that the strong codes associated with a particular program dominate, then the program associated with those codes may only be credited with consumption if that program is a radio program. This is based on the presumption that if the strong codes of a television signal are dominate (i.e., the weak codes are relatively scarce or absent), the codes received in connection with that television signal originated in another room (i.e., out-of-room). Still further, if the central facility 140 determines that the ratio of strong and weak codes falls somewhere in between one-to-one and the condition in which strong codes are considered dominant, the central facility 140 may provide partial credit (or a distant/quiet rating) in the case where those codes are associated with a television program.

Although certain methods, apparatus and articles of manufacture have been described herein, the scope of coverage of this patent is not limited thereto. To the contrary, this patent covers all method, apparatus and articles of manufacture fairly falling within the scope of the appended claims either literally or under the doctrine of equivalents.

What is claimed is:

1. A method of decoding a media signal, comprising:
   using a processor to determine a physical environment type associated with the media signal by determining that the physical environment type is an in-home environment or an out-of-home environment;
   selecting a decoding mode based on the physical environment type; and
   decoding a code from the media signal using the selected decoding mode.

2. A method as defined in claim 1, wherein using the processor to determine the physical environment type comprises analyzing acoustic characteristics of the physical environment based on the media signal.

3. A method of decoding a media signal, comprising:
   using a processor to determine a physical environment type associated with the media signal by analyzing a frequency spectrum or a signal amplitude of the media signal;
   selecting a decoding mode based on the physical environment type; and
   decoding a code from the media signal using the selected decoding mode.

4. A method of decoding a media signal, comprising:
   using a processor to determine a physical environment type associated with the media signal by extracting the code from the media signal and analyzing characteristics of the code;
   selecting a decoding mode based on the physical environment type; and
   decoding a code from the media signal using the selected decoding mode.

5. A method as defined in claim 4, wherein analyzing the characteristics of the code comprises at least one of analyzing a power level of the code, analyzing a frequency spectrum of the code, or comparing the code to information stored in a database.

6. A method of decoding a media signal, comprising:
   using a processor to determine a physical environment type associated with the media signal by extracting a plurality of codes from the media signal and comparing at least one of the extracted codes to another one of the extracted codes;

selecting a decoding mode based on the physical environment type; and decoding a code from the media signal using the selected decoding mode.

7. A method of decoding a media signal, comprising:

using a processor to determine a physical environment type associated with the media signal by obtaining via a portable metering device a base metering device identification code emitted by a base metering device;

selecting a decoding mode based on the physical environment type; and decoding a code from the media signal using the selected decoding mode.

8. A method of decoding a media signal, comprising:

using a processor to determine a physical environment type associated with the media signal;

selecting a decoding mode based on the physical environment type by selecting a code detection threshold; and decoding a code from the media signal using the selected decoding mode.

9. A method as defined in claim 8, wherein the code detection threshold is at least one of an amplitude threshold or a frequency threshold.

10. A method of decoding a media signal, comprising:

using a processor to determine a physical environment type associated with the media signal;

selecting a decoding mode based on the physical environment type by adjusting a gain setting of an automatic gain control circuit; and decoding a code from the media signal using the selected decoding mode.

11. A method of decoding a media signal, comprising:

using a processor to determine whether to obtain the media signal via a portable metering device or a base metering device by determining that the portable metering device and the base metering device are located within different rooms of a household;

determining a physical environment type associated with the media signal;

selecting a decoding mode based on the physical environment type; and decoding a code from the media signal using the selected decoding mode.

12. A method of decoding a media signal, comprising:

using a processor to determine whether to obtain the media signal via a portable metering device or a base metering device, by:

emitting a plurality of presence codes via the portable metering device; and determining that the amount of time since the base metering device last received a presence code from the portable metering device is greater than a time threshold;

determining a physical environment type associated with the media signal;

selecting a decoding mode based on the physical environment type; and decoding a code from the media signal using the selected decoding mode.

* * * * *